(12) United States Patent
Kisselstein et al.

(10) Patent No.: US 10,833,496 B2
(45) Date of Patent: Nov. 10, 2020

(54) CONFIGURABLE ENCLOSURE

(71) Applicant: PPC BROADBAND, INC., East Syracuse, NY (US)

(72) Inventors: Jay A. Kisselstein, Mexico, NY (US); Brian K. Hanson, Cicero, NY (US); Cameron James Adams, Camillus, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 0 days.

(21) Appl. No.: 16/667,640

(22) Filed: Oct. 29, 2019

(65) Prior Publication Data

US 2020/0067295 A1 Feb. 27, 2020

Related U.S. Application Data

(63) Continuation-in-part of application No. 15/601,977, filed on May 22, 2017, now Pat. No. 10,461,516, which is a continuation of application No. 14/611,710, filed on Feb. 2, 2015, now Pat. No. 9,660,430, which is a continuation of application No. 13/074,644, filed on Mar. 29, 2011, now Pat. No. 8,944,267.

(51) Int. Cl.
*H02G 3/14* (2006.01)
*H02G 3/08* (2006.01)

(52) U.S. Cl.
CPC ............... *H02G 3/083* (2013.01); *H02G 3/14* (2013.01)

(58) Field of Classification Search
CPC .......... H02G 3/14; H02G 3/083; H02G 3/081; H02G 3/086
USPC ......................................................... 220/3.7
See application file for complete search history.

(56) References Cited

U.S. PATENT DOCUMENTS

| | | |
|---|---|---|
| 3,877,601 A | 4/1975 | Evans et al. |
| 4,467,938 A | 8/1984 | Allen |
| 4,742,585 A | 5/1988 | Logsdon |
| 4,759,463 A | 7/1988 | Mazoin |
| 4,770,311 A | 9/1988 | Wang |
| 4,990,345 A | 2/1991 | Webb |
| 5,114,068 A | 5/1992 | Reil et al. |
| 5,125,527 A | 6/1992 | Parlatore et al. |
| D331,740 S | 12/1992 | Kaplan |
| 6,184,468 B1 | 2/2001 | Speziale |
| 6,242,697 B1 | 6/2001 | Gerken et al. |
| 6,264,056 B1 | 7/2001 | King |
| 6,265,670 B1 | 7/2001 | Duesterhoeft et al. |
| 6,274,809 B1 | 8/2001 | Pudims et al. |

(Continued)

*Primary Examiner* — King M Chu
(74) *Attorney, Agent, or Firm* — MH2 Technology Law Group, LLP

(57) ABSTRACT

A configurable enclosure including a cover operably attached to a base. The base includes a wall disposed along a perimeter of a bottom surface and a bottom surface having first and second removable portions configured to be peeled away from the base portion to create an opening through the bottom surface. Moreover, the bottom surface includes thin sections located between first and second tracks that extend around outer edges of each of the removable portions. Actuators are operably attached to the first and second tracks, wherein through actuation of the actuator, the removable portions peel away from the base to create an opening through the bottom surface.

20 Claims, 25 Drawing Sheets

(56) References Cited

U.S. PATENT DOCUMENTS

| | | |
|---|---|---|
| D452,487 S | 12/2001 | Kaplan |
| 6,545,216 B1 | 4/2003 | Bell et al. |
| 6,669,041 B2 | 12/2003 | Almond |
| 6,765,147 B1 | 7/2004 | Weiss et al. |
| 6,914,187 B2 | 7/2005 | Hull et al. |
| 6,953,890 B2 | 10/2005 | Koessler |
| 7,078,623 B1 | 7/2006 | Sheehan |
| 7,353,961 B2 | 4/2008 | Hull et al. |
| 7,359,611 B1 | 4/2008 | Kaplan |
| 7,432,439 B2 | 10/2008 | Takada et al. |
| 7,477,829 B2 | 1/2009 | Kaplan |
| 7,575,122 B2 | 8/2009 | Hull et al. |
| 7,918,430 B2 | 4/2011 | Romerein et al. |
| 7,963,497 B2 | 6/2011 | Romerein et al. |
| 8,254,567 B2 * | 8/2012 | Kaplan ................ H04B 1/3888 379/441 |
| 8,777,279 B2 | 7/2014 | Kothy |
| 2003/0136780 A1 | 7/2003 | Sato et al. |
| 2003/0178421 A1 | 9/2003 | Almond |
| 2009/0314907 A1 | 12/2009 | Romerein et al. |
| 2011/0031365 A1 | 2/2011 | Romerein et al. |

* cited by examiner

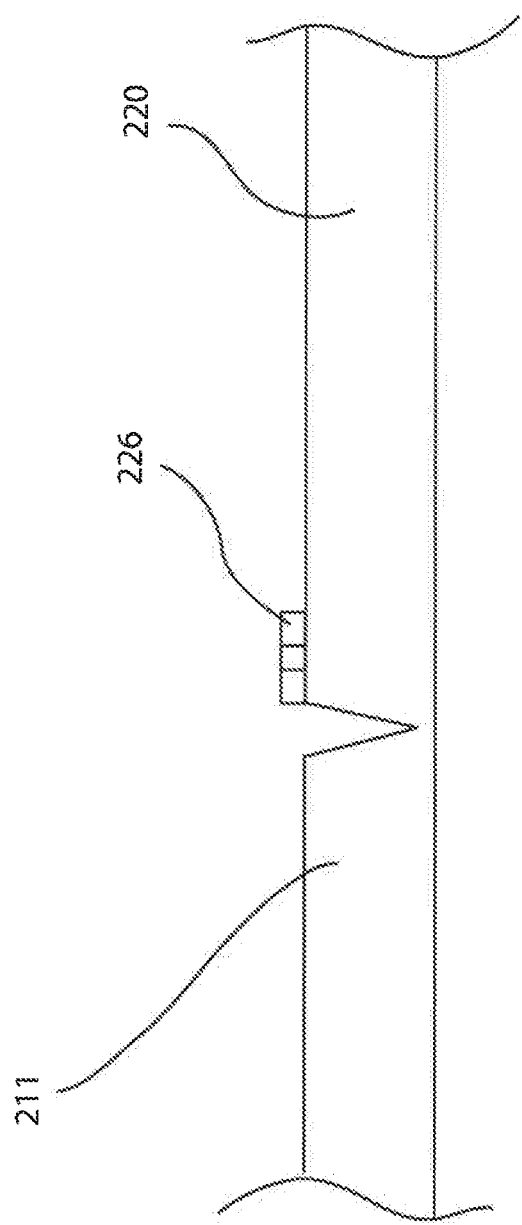

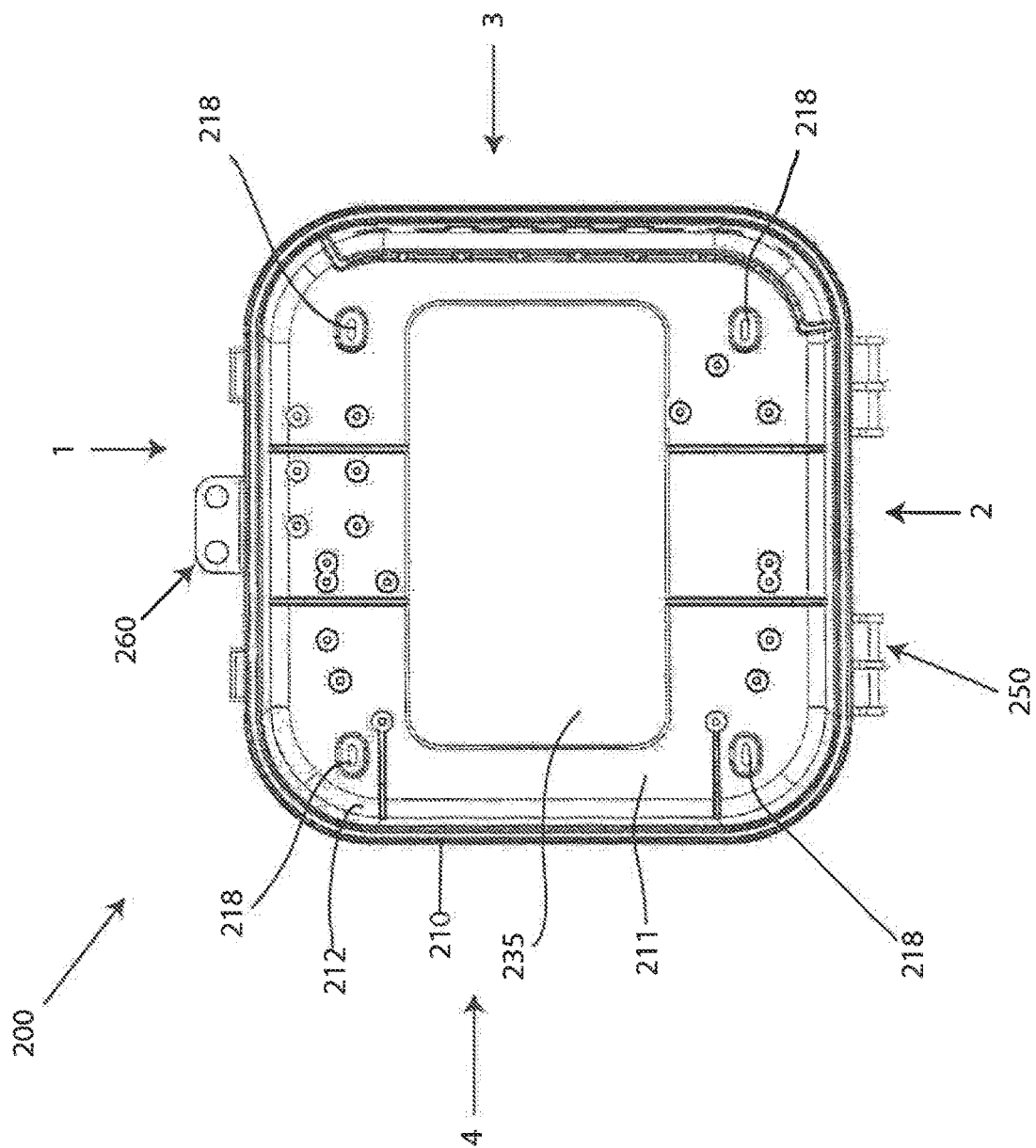

CONFIGURABLE ENCLOSURE

CROSS REFERENCE TO RELATED APPLICATIONS

This application is a Continuation-in-Part of application Ser. No. 15/601,977, filed May 22, 2017, which is a Continuation of application Ser. No. 14/611,710, filed Feb. 2, 2015, now U.S. Pat. No. 9,660,430, which is a Continuation of application Ser. No. 13/074,644, filed Mar. 29, 2011, now U.S. Pat. No. 8,944,267. The disclosure of the prior applications is hereby incorporated by reference herein in its entirety.

FIELD OF TECHNOLOGY

The following relates to a configurable enclosure, and more specifically to embodiments of an enclosure that eliminates the need for tools during installation.

BACKGROUND

Installation of cable service requires some transmission lines and other electronic equipment to remain outdoors, housed within an enclosure, such as a cable box shield. The enclosure is typically externally mounted to a structure, such as a dwelling, an office building, or a pole. Housing the transmission lines and other electronic equipment within the externally mounted enclosure allows a technician to service a location, often times without the need to enter a consumer's home or office, by accessing the housed transmission lines and other equipment. However, existing hardware, connections, and various ports on the structure may present a problem when mounting the enclosure to the structure. Generally, tools, such as a hammer and knife, are required to punch out or cut away a portion of the enclosure to fit over the existing hardware, connections, and various ports. Using tools to carefully extract a portion of the enclosure adds installation time, and exposes the technician to injury and the enclosure to damage, even for the most skilled technician.

Thus, a need exists for an apparatus and method for removing a portion of an enclosure without the need for tools during installation.

SUMMARY

A first general aspect relates to a configurable enclosure comprising a cover portion operably attached to a base portion, the base portion including a wall disposed along a perimeter of a bottom surface, and a removable portion of the bottom surface configured to be peeled away from the base portion to create an opening on the bottom surface.

A second general aspect relates to an apparatus comprising an enclosure having a cover portion operably attached to a base portion, the base portion including a wall disposed around a perimeter of a bottom surface, and a track disposed on the bottom surface of the base portion, the track substantially surrounding a removable portion of the bottom surface, wherein the track is attached to a thin portion of the bottom surface, wherein when the track is peeled away from the bottom surface, the removable portion is released from the base portion.

A third general aspect relates to an apparatus comprising an enclosure having a cover portion operably attached to a base portion, the base portion including a wall disposed around a perimeter of a bottom surface, a thin section of the bottom surface located proximate an outer edge of a removable portion of the bottom surface, and an actuator operably attached to the removable portion, wherein through actuation of the actuator, the removable portion peels away from the bottom surface to create an opening on the base portion.

A fourth general aspect relates to a configurable enclosure comprising a cover portion operably attached to a base portion, the base portion including a wall disposed along a perimeter of a bottom surface, and a means for peeling away a portion of the bottom surface of the base portion.

A fifth general aspect relates to a method of creating an opening in a configurable enclosure, comprising providing an enclosure having a cover portion operably attached to a base portion, the base portion including a wall disposed around a perimeter of a bottom surface, disposing a track on the bottom surface of the base portion, the track substantially surrounding a removable portion of the bottom surface, and reducing a thickness of the bottom surface proximate an outer edge of the removable portion, wherein the track is configured to be peeled from the bottom surface to release the removable portion and create an opening in the base portion.

A sixth general aspect relates to a method of creating an opening in a configurable enclosure, comprising providing an enclosure having a cover portion operably attached to a base portion, the base portion including a wall disposed around a perimeter of a bottom surface, disposing an actuator on a removable portion of the bottom surface of the base portion, and reducing a thickness of the bottom surface proximate an outer edge of the removable portion, wherein the actuator is configured to be pulled to peel away the removable portion and create an opening in the base portion.

The foregoing and other features of construction and operation will be more readily understood and fully appreciated from the following detailed disclosure, taken in conjunction with accompanying drawings.

BRIEF DESCRIPTION OF THE DRAWINGS

Some of the embodiments will be described in detail, with reference to the following figures, wherein like designations denote like members, wherein:

FIG. 7B depicts a cross-section view of the bottom surface of the second embodiment of the enclosure;

FIG. 8 depicts a top view of the second embodiment of the enclosure after the removable portion has been removed;

DETAILED DESCRIPTION OF EMBODIMENTS

A detailed description of the hereinafter described embodiments of the disclosed apparatus and method are presented herein by way of exemplification and not limitation with reference to the Figures. Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure.

As a preface to the detailed description, it should be noted that, as used in this specification and the appended claims, the singular forms "a", "an" and "the" include plural referents, unless the context clearly dictates otherwise.

Figure 1:
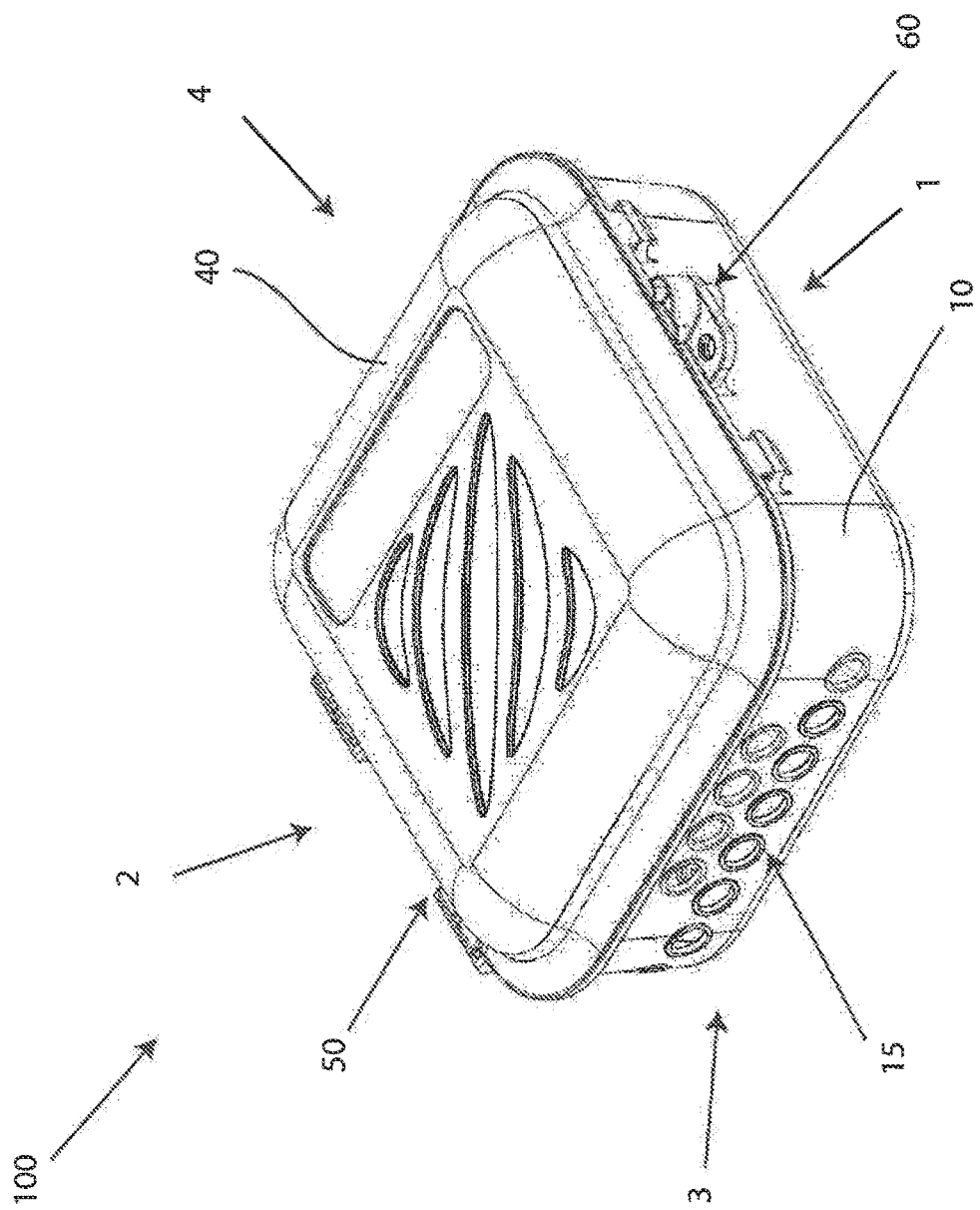
FIG. 1 depicts a perspective view of a first embodiment of an enclosure in a closed position.

Referring to the drawings, FIG. 1 depicts an embodiment of an enclosure 100. Enclosure 100 may be a configurable enclosure, a terminal box, a cable box shield, a cable box, a junction box, a service box, and the like. Enclosure 100 may be used to house, enclose, shield, cover, protect, etc., various devices associated with broadband communications, including transmission lines, such as coaxial cables, optical fibers, and the like, splitters, switches, electrical wiring, and other specialized electronic and/or communication equipment. Moreover, enclosure 100 may be externally mounted to a structure during installation of cable service or other broadband communication service.

Embodiments of enclosure 100 may include a base portion 10 and a cover portion 40. The base portion 10 may include a plurality of openings 15 and a removable portion 20. Embodiments of enclosure 100 may further include a connection means 50 to operably attach the cover portion 40 to the base portion 10, and a locking means 60 to secure the enclosure 100 in a closed position. Other embodiments of enclosure 100 may include a cover portion 40 operably attached to a base portion 10, the base portion 10 including a wall 12 disposed along a perimeter of a bottom surface 11, and a removable portion 20 of the bottom surface 11 configured to be peeled away from the base portion 10 to create an opening 35 on the bottom surface 11. Embodiments of enclosure 100 may also include a cover portion 40 operably attached to a base portion 10, the base portion 10 including a wall 12 disposed along a perimeter of a bottom surface 11, and a means for peeling away a portion of the bottom surface 11 of the base portion 10.

Figure 2:
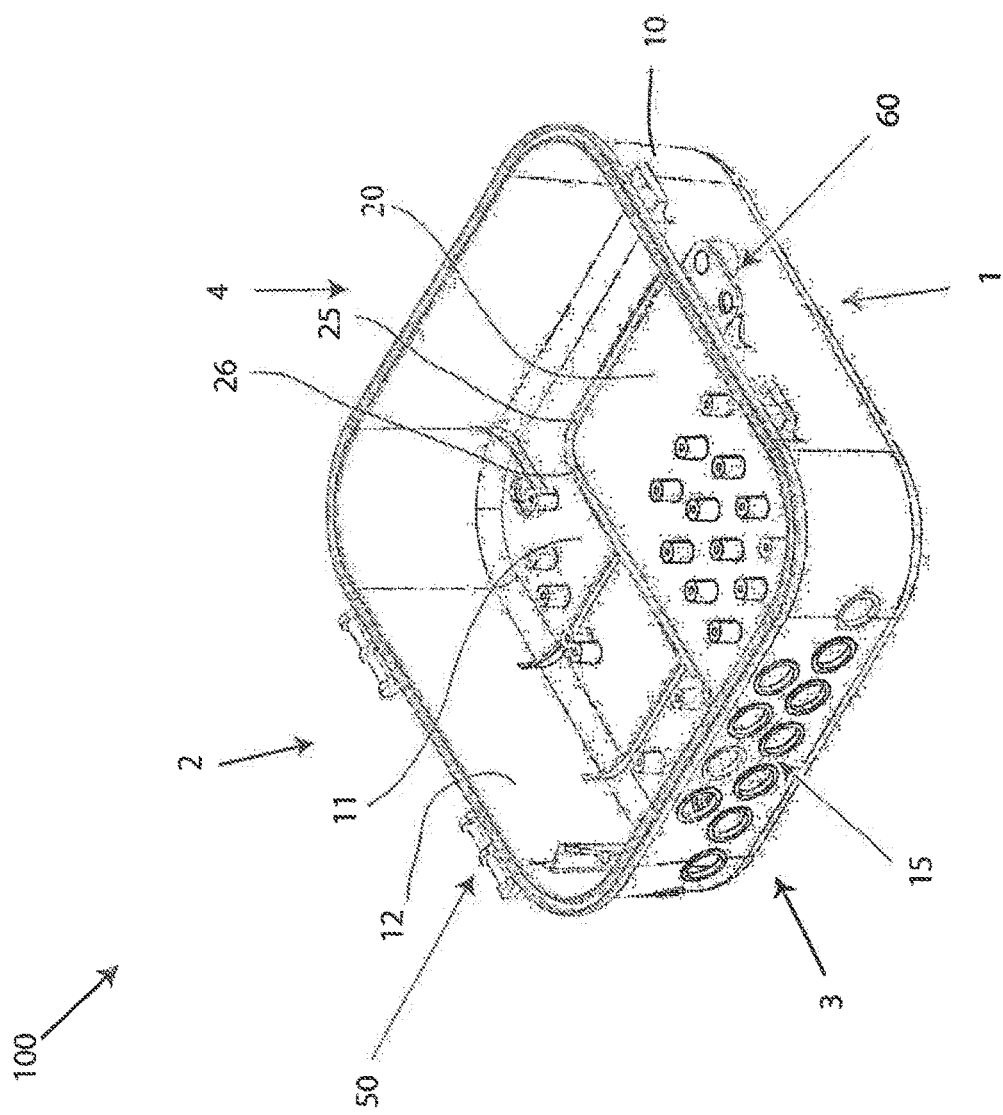
FIG. 2 depicts a perspective view of the first embodiment of the enclosure.

Referring now to FIG. 2, embodiments of enclosure 100 may include a base portion 10. The base portion 10 may include a bottom surface 11 and a wall 12. The wall 12 may be a wall, side, edge, side wall, barrier, and the like, having a certain height extending upwards from the bottom surface 11. The wall 12 may extend along a perimeter of the bottom surface 11, wherein the wall 12 is structurally integral with the bottom surface 11 (e.g. the bottom surface 11 and the wall 12 may be molded as a single structural component). The bottom surface 11 may be many different shapes, such as a rectangle, square, circle, etc. which may determine the overall shape and configuration of the enclosure 100. Thus, the enclosure 100 may be a square enclosure, a rectangular enclosure, a circular enclosure, or any polygonal enclosure. Rectangular, square, and quadrilateral embodiments of enclosure 100 may include a first end 1, a second end 2, a first side 3, and a second side 4. Moreover, the height of the wall 12 can determine a depth of the enclosure 100, with respect to the base portion 10. Likewise, the height of the wall 12 in conjunction with the surface area of the bottom surface 11 may determine the volume of the base portion 10. The base portion 10 may be comprised of molded plastic, composites, metal, or a combination of materials. For example, the base portion 10 may include metallic components attached to or integrated with the overall molded plastic structure.

Positioned somewhere on the bottom surface 11 may be at least one mounting hole 18. The mounting hole 18, or the plurality of the mounting holes 18 may be a means to secure, mount, affix, etc., the enclosure 100 to a structure. Embodiments of enclosure 100 may include a mounting hole 18 proximate or otherwise near each corner of the base portion 10. The mounting holes 18 may accept various fasteners, such as screws, to fasten the enclosure 100 to a structure or other rigid body, such as a pole. Additionally, a plurality of pegs may be placed within the base portion 10 to assist the arrangement and operable placement of transmission lines and/or other equipment inside the enclosure 100. The pegs may upwardly protrude from the bottom surface 11 a distance, generally shorter than the height of wall 12 of the base portion 10; however, the pegs may protrude further than the height of the wall 12 if the cover portion 40 is dimensioned to add volume to the enclosure 100 when in a closed position.

Figure 14:
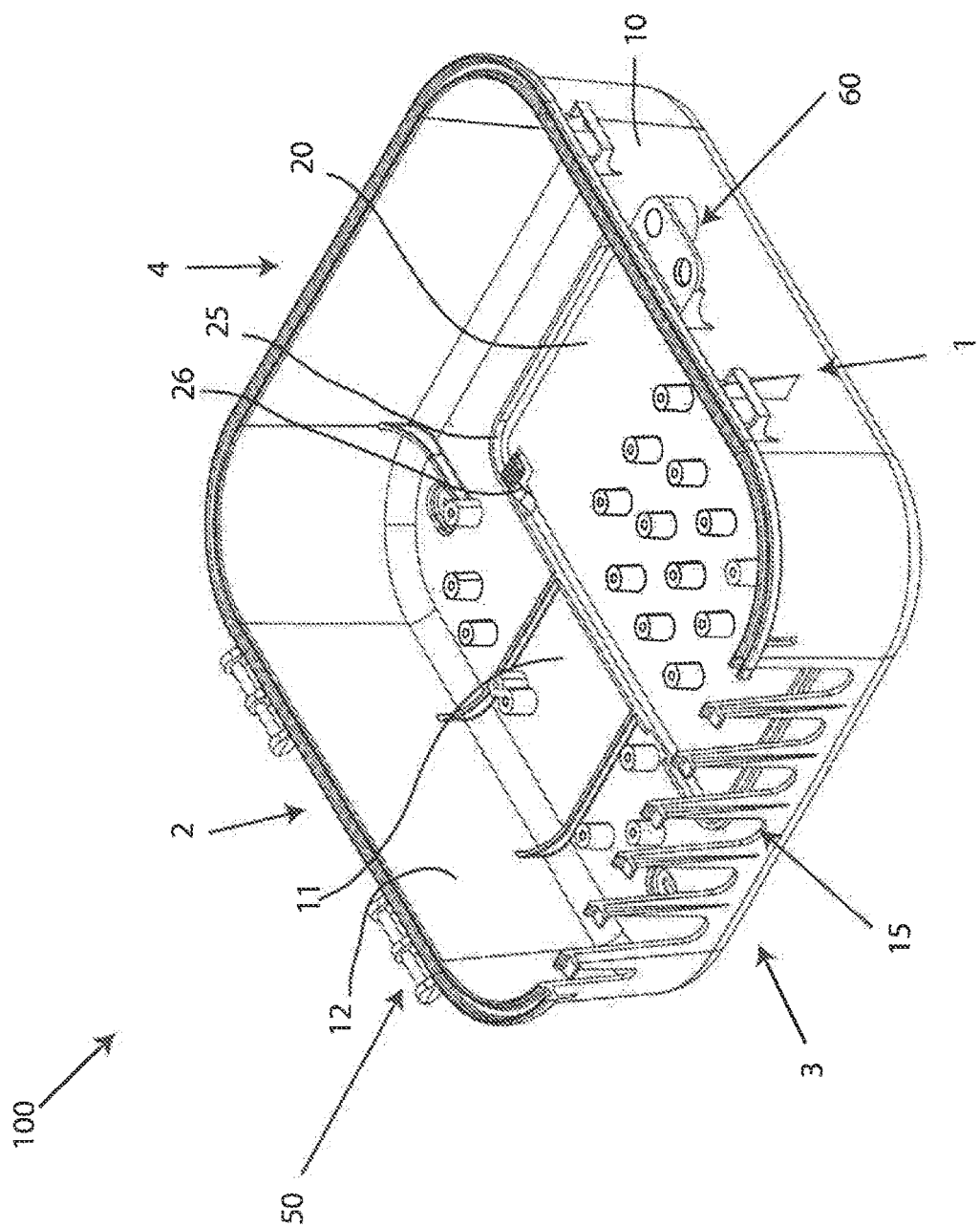
FIG. 14 depicts a perspective view of the first embodiment of the enclosure having a plurality of slots on a side wall.
Figure 15:
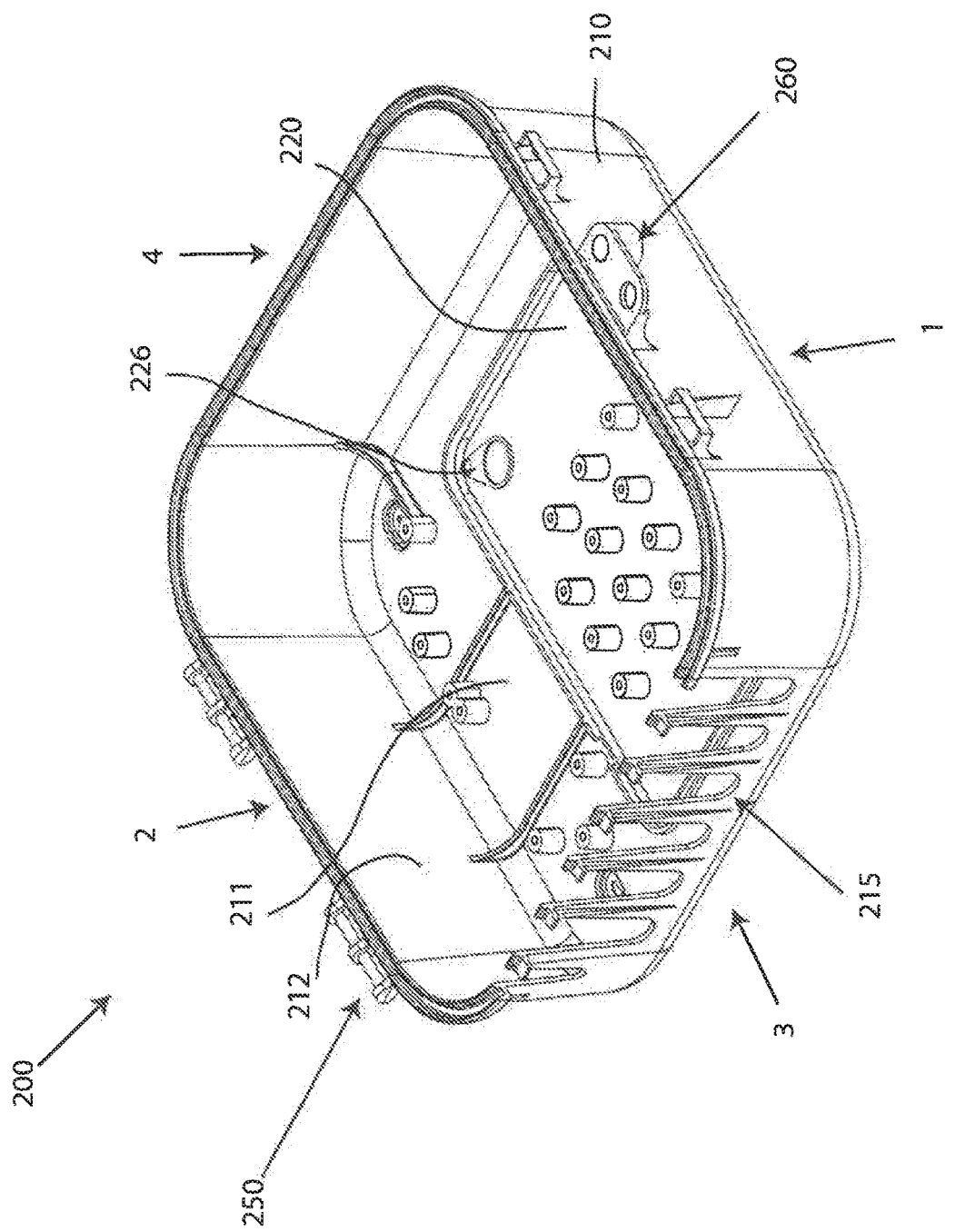
FIG. 15 depicts a perspective view of the second embodiment of the enclosure having a plurality of slots on a side wall.
Figure 16:
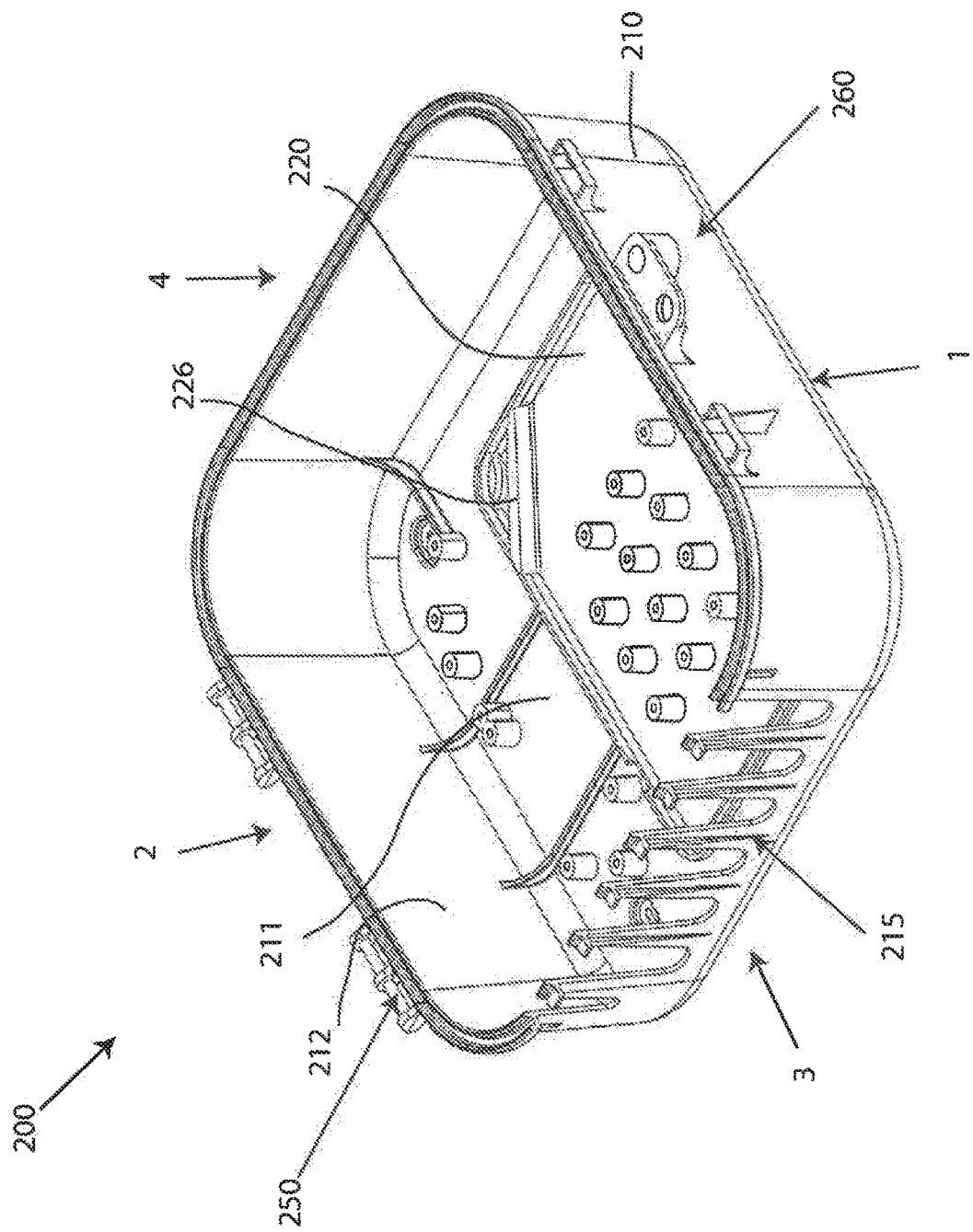
FIG. 16 depicts a perspective view of the second embodiment of the enclosure having a plurality of slots on a side wall, wherein an embodiment of the removable portion is partially removed.
Figure 17:
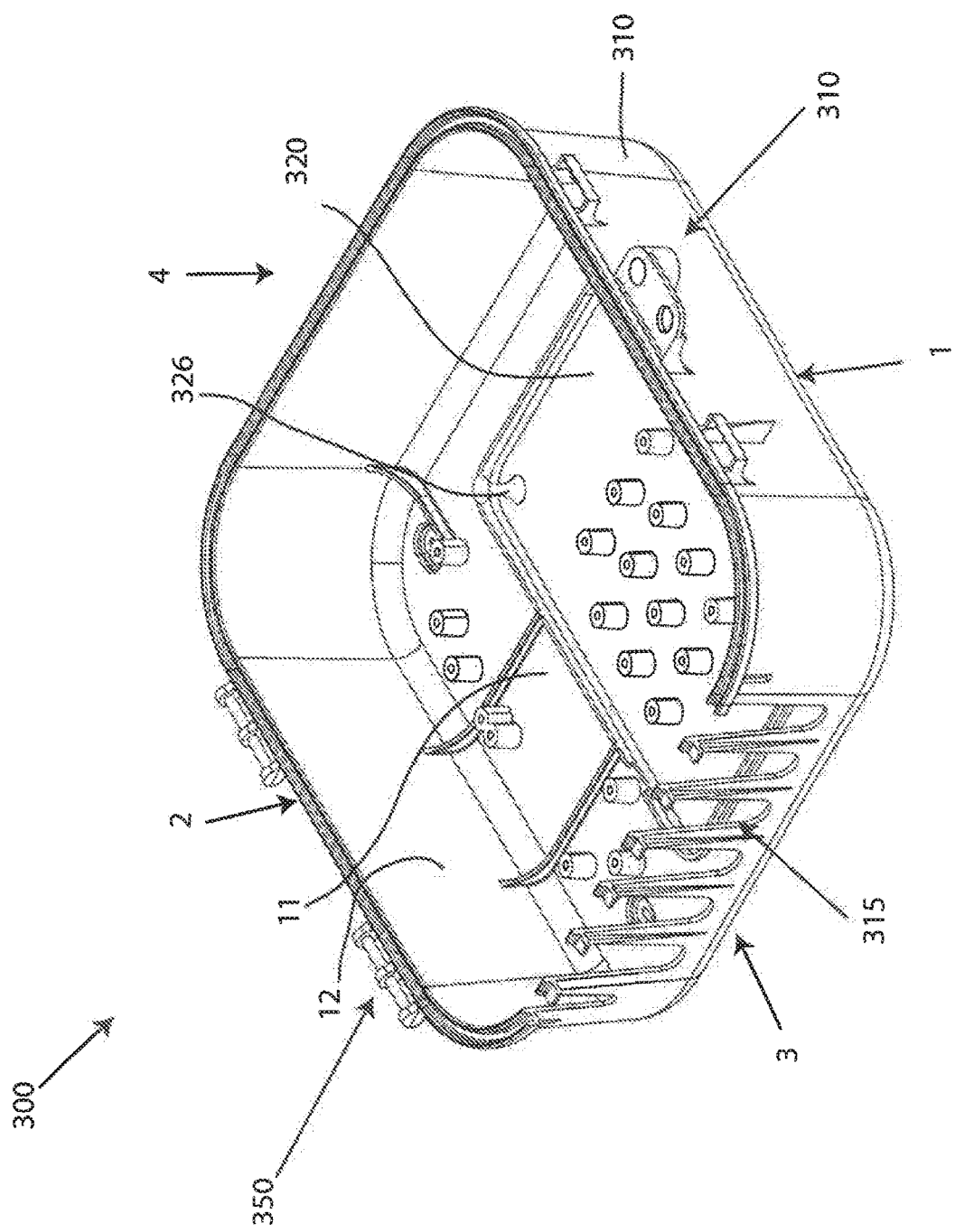
FIG. 17 depicts a perspective view of the third embodiment of the enclosure having a plurality of slots on a side wall.
Figure 18:
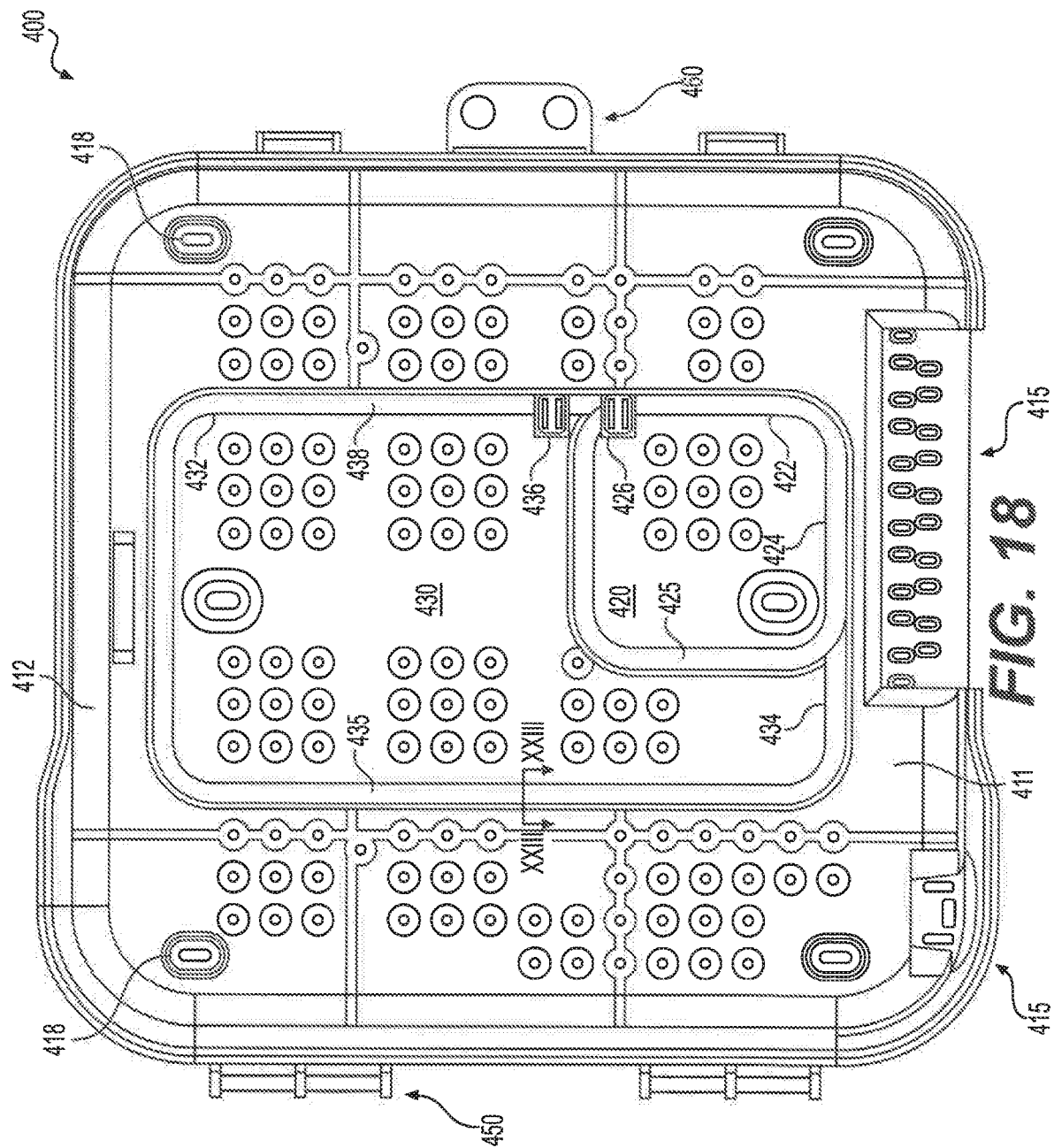
FIG. 18 is a top view of a base of an exemplary enclosure in accordance with various aspects of the disclosure.
Figure 19:
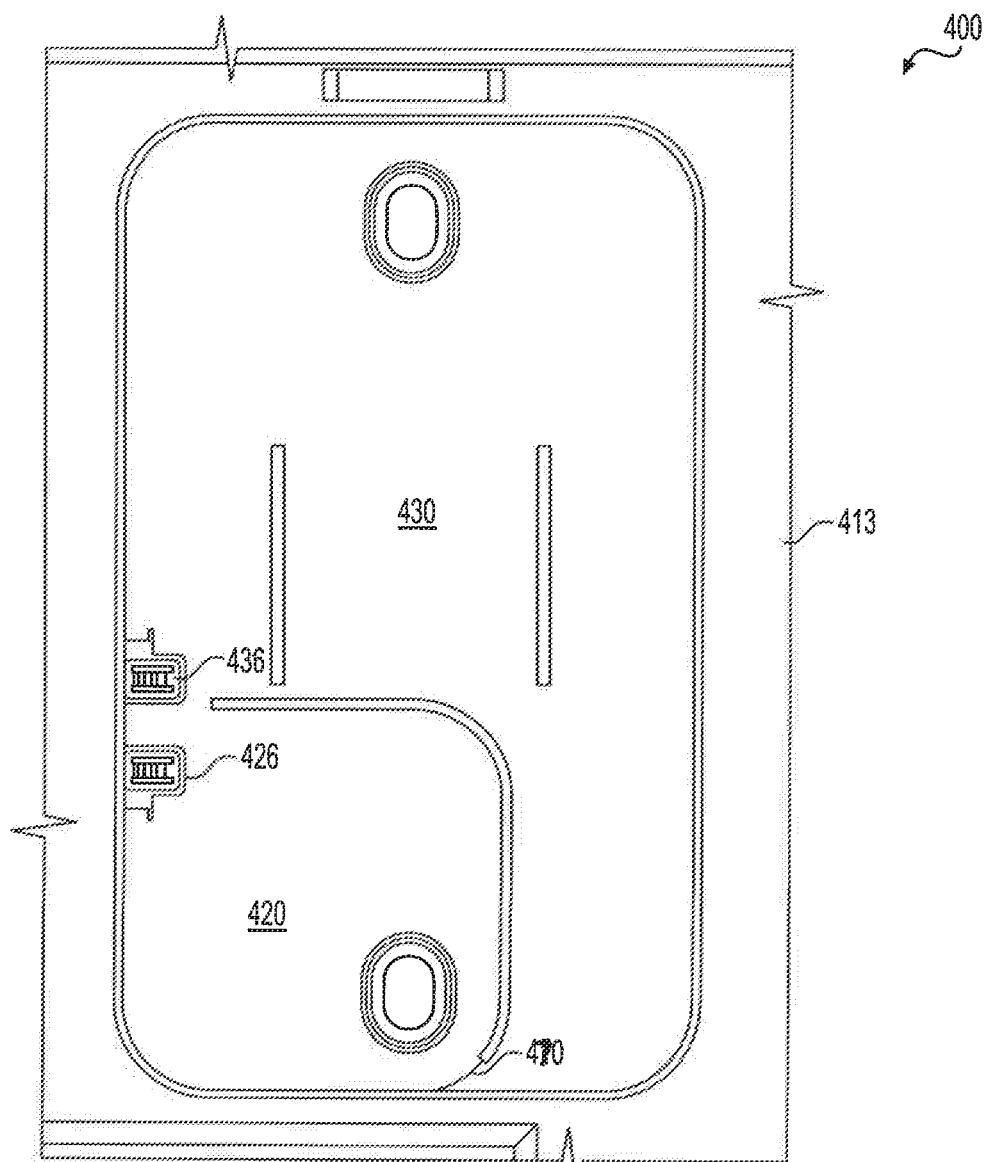
FIG. 19 is a bottom view of the back surface of the base of the enclosure of FIG. 18.

Furthermore, a plurality of openings 15 may be positioned on the wall 12 to provide clearance for transmission lines, line wiring, load wiring, electrical wires, and other telecommunication paths to enter the enclosure 100 and interact with the equipment and lines located within the enclosure 100. The plurality of openings 15, or a single opening, may be an opening, hole, access point, access hole, slot, slit, and the like, which may allow a coaxial cable, or similar line, to pass through the wall 12 of the base portion 10. Embodiments of the plurality of openings 15 of enclosure 100 being a plurality of slots in the wall 12 that include an open end at the top of the wall 12 such that cables, lines, etc. may be dropped into the accommodating slot, (e.g. U-shaped or valley shaped) is shown in FIG. 14. FIGS. 15-17 show similar embodiments of slots 215, 315 in the wall 12, 212, 312 of enclosure 200, 300, respectively. Embodiments of enclosure 100 may include a plurality of openings 15 on the wall 12 proximate the first side 3. Further embodiments include a plurality of openings 15 on both the first side 3 and the second side 4. However, those skilled in the art should appreciate that a plurality of openings 15, or a single opening, may also be present on the first end 1 and the second end 2, or could be present on each side or any combination of sides of the enclosure 100 to allow for multiple configurations of enclosure 100. Generally, the openings 15 are circular or U-shaped and sized to accommodate common broadband equipment, such as coaxial cable; however, the shape of the openings 15 may be any shape or size to accommodate various shaped/sized equipment, such as slots shown in FIG. 14. The enclosure 100 may be provided with pre-existing openings 15, or the enclosure 100 may be provided with a means to punch out the openings 15 as desired. For example, the base portion 10 may include a plurality of openings 15 that function as knockouts along the wall 12 to allow a technician/installer to create access holes at the time of installation, as opposed to the base portion 10 being manufactured with pre-existing openings 15. Embodiments of the enclosure 100 may include knockouts at other locations/orientations in addition to pre-existing openings 15 along the wall 12 of the base portion 10. The knockouts may be formed by conventional methods known to those skilled in the art, such as scoring the wall 12 of the base portion 10, at the time of manufacture.

Figure 3:
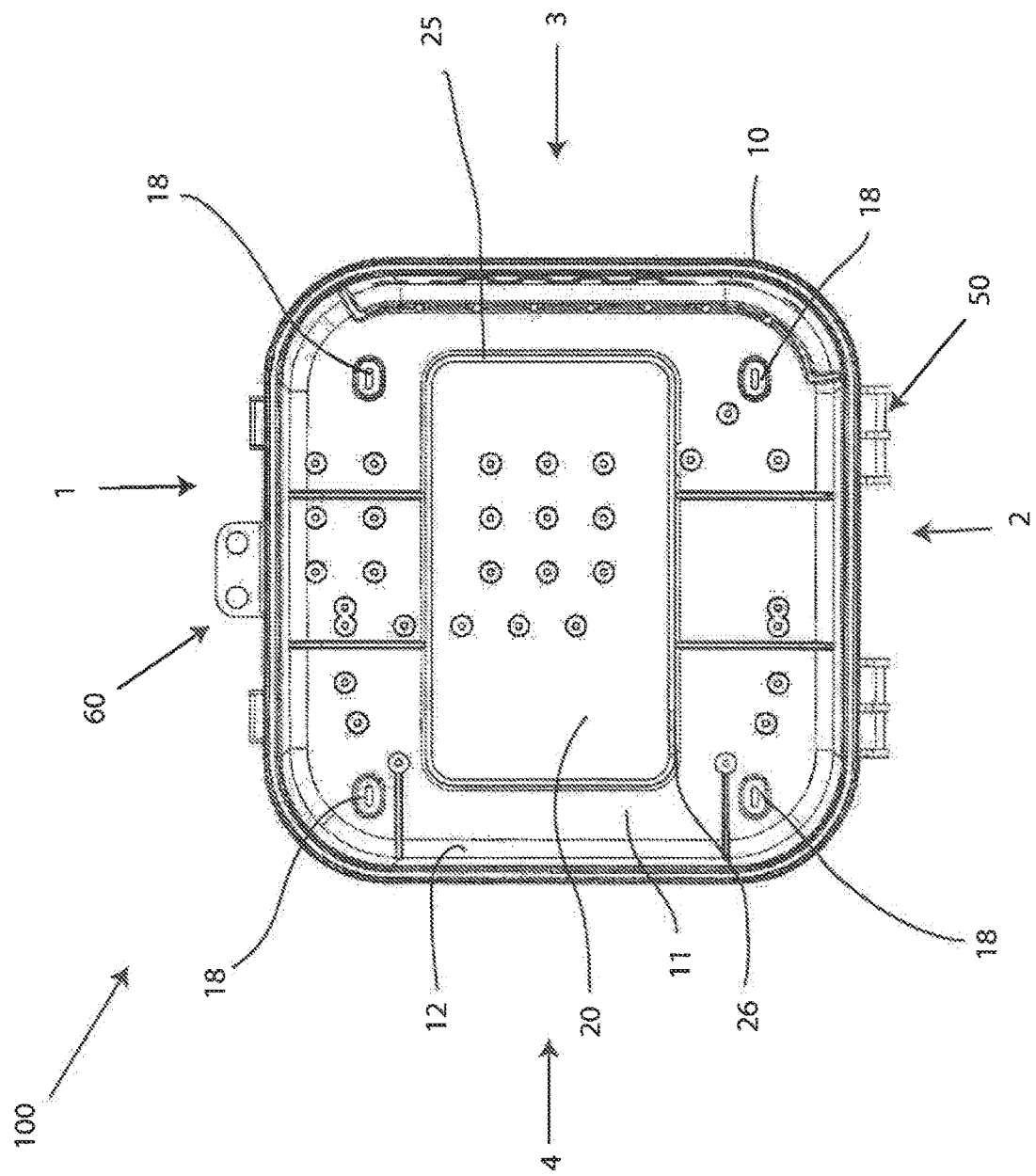
FIG. 3 depicts a top view of the first embodiment of the enclosure.
Figure 5:
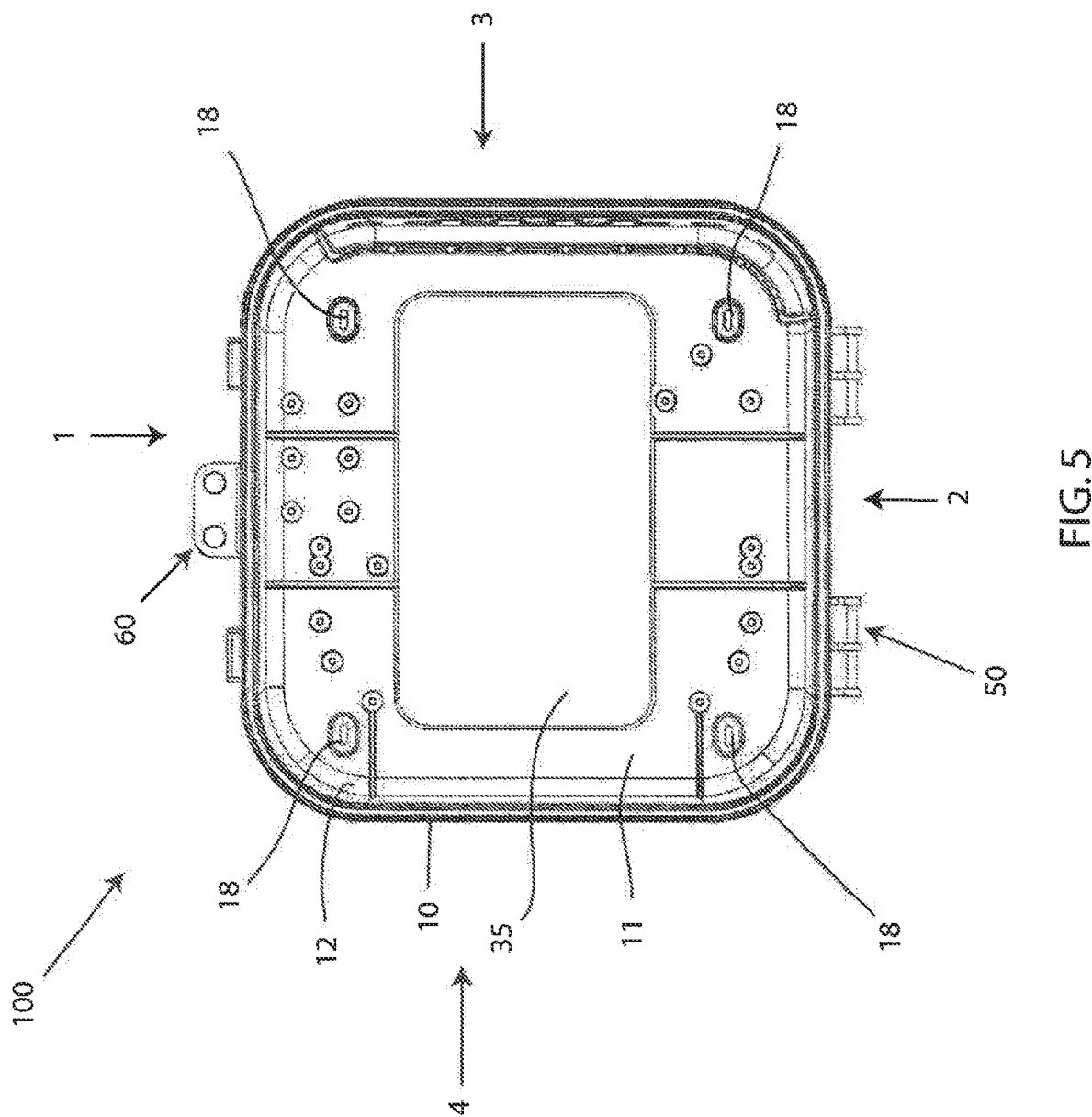
FIG. 5 depicts a top view of the first embodiment of the enclosure after the removable portion has been removed.

With continued reference to FIG. 2, and additional reference to FIG. 3, embodiments of enclosure 100 may include one or more removable portions 20. The removable portion 20 of the base portion 10 may be removed without the use of tools or other items associated with punching out and/or cutting away a portion of an enclosure, such as enclosure 100. For example, the removable portion 20 may be removed, peeled away, discarded, eliminated, extracted, etc. from the bottom surface 11 of the base portion 10 to expose the internals of the enclosure 100. In other words, a portion of the bottom surface 11 of the base portion 10 may be removed, or peeled away, to create an opening 35 in the bottom surface 11 (e.g. by the removal and displacement of the removable portion 20 of the base portion 10). The opening 35 (as shown in FIG. 5) created when a portion of the bottom surface 11 is removed may provide the necessary clearance for any existing hardware, connections, and various ports which may be located on a structure when mounting the enclosure 100 to the structure. For instance, a technician may need to install an enclosure 100 at a location on the outer wall of the structure where existing hardware is fixedly mounted. Instead of wielding a knife and hammer to carve out a portion of the bottom surface of an enclosure to clear the existing hardware, the technician may remove, peel away, tear away, etc., without tools, on or more removable portions 20 from the enclosure 100 without risking injury to themselves or damage to the enclosure 100.

Referring now to FIGS. 2-3, removing the removable portion 20 from the enclosure 100 may involve peeling away a track 25 positioned on the bottom surface 11 of the base portion 10 to release a portion of the bottom surface 11 from the base portion 10. The portion of the bottom surface 11 being released from the base portion 10 after the track 25 has been peeled away may be referred to as the removable portion 20. The removable portion 20 may be a single-piece removable portion 20, or may be segmented into multiple sections of the removable portion 20 (i.e. multiple sections of the removable portion 20 each having a track and actuator to facilitate the removal of a section of the removable portion 20). The size of the removable portion 20 may vary, and may be determined at the time of manufacturing; the size of the track 25 should correspond to the size of the desired removable portion 20. The track 25 may be located proximate or otherwise near the perimeter of the removable portion 20, and extend around or substantially around the perimeter of the removable portion 20. In other words, the track 25 may be disposed on the bottom surface 11 of the base portion 10, around the removable portion 20, which may help identify the removable portion 20. Once the track 25 is completely peeled away, the removable portion 20 may cleanly fall away from the enclosure 100. Attached to the track 25 may be an actuator 26, such as a pull tab, which may facilitate the removal of the track 25. For instance, a user may grip the actuator 26, which may protrude from the track 25, and pull the actuator 26 in a direction away from the bottom surface 11 to peel away the track 25 from the base portion 10. Accordingly, embodiments of enclosure 100 may include a cover portion 40 operably attached to a base portion 10, the base portion 10 including a wall 12 disposed around a perimeter of a bottom surface 10, and a track 25 disposed on the bottom surface 11 of the base portion 10, the track 25 substantially surrounding a removable portion 20 of the bottom surface 10, wherein the track 25 is attached to a thin portion of the bottom surface 11, wherein when the track 25 is peeled away from the bottom surface 11, the removable portion 20 is released from the base portion 10.

Figure 4A:
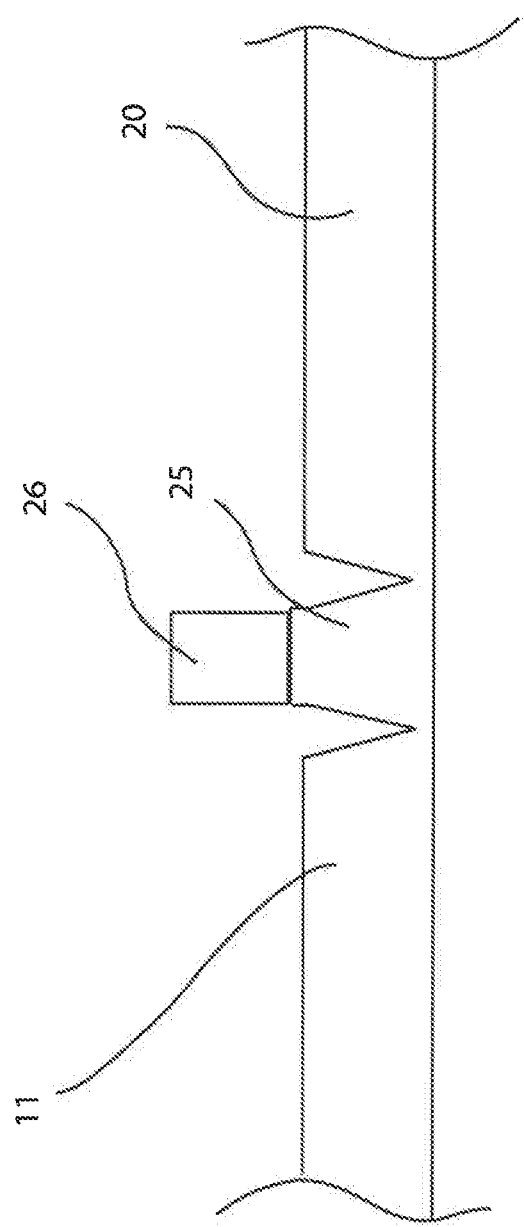
FIG. 4A depicts a cross-section view of an embodiment of a bottom surface and a removable portion in accordance with the first embodiment of the enclosure.
Figure 4B:
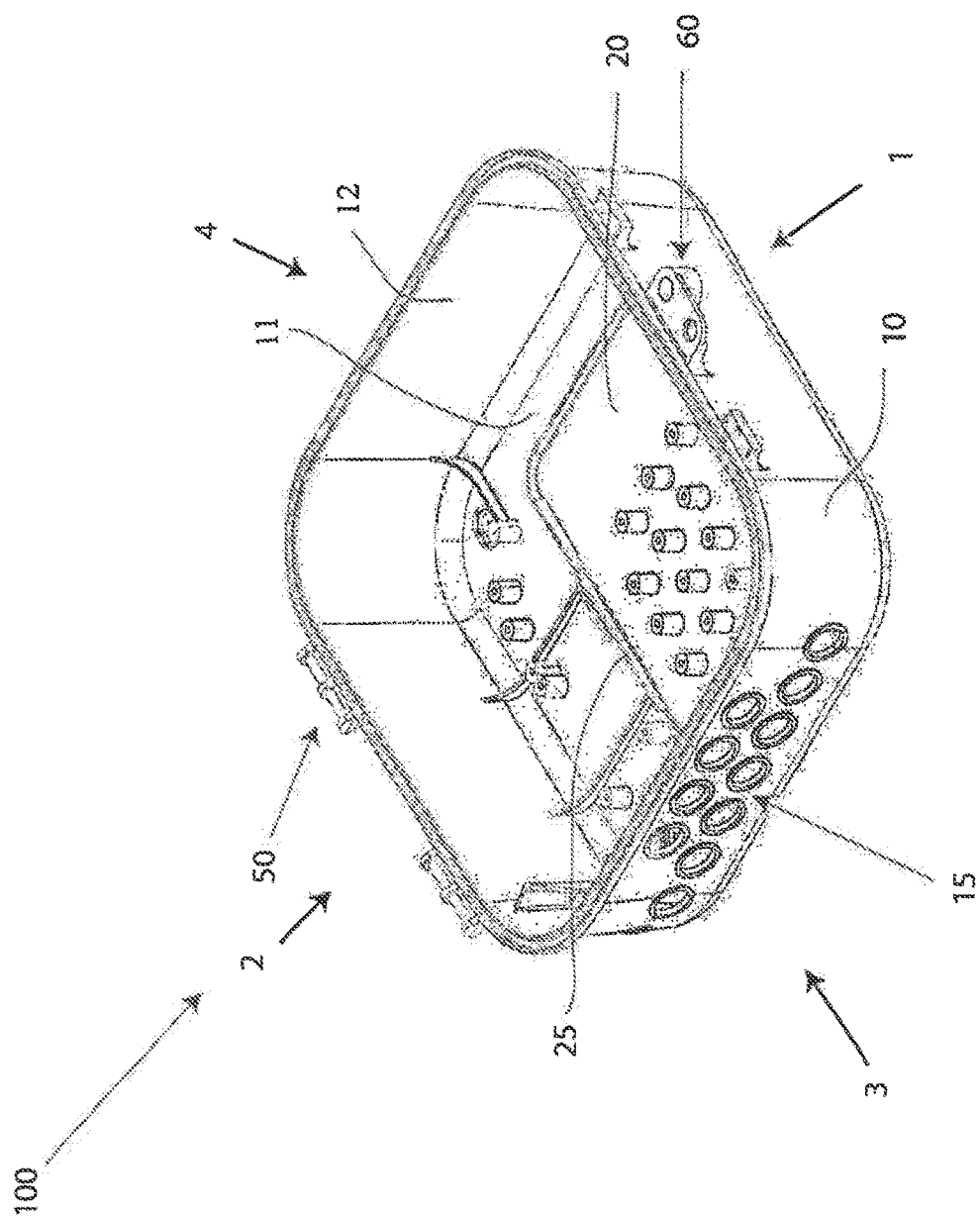
FIG. 4B depicts a perspective view of the first embodiment of the enclosure with an embodiment of a track partially peeled from the bottom surface.

With reference to FIGS. 4A and 4B, the removal or peeling away of the track 25 causes the removable portion 20 to peel away or fall from the base portion 10 because the force/stress exerted by the movement of the track 25 severs a thin structural or mechanical bond between the track 25 and the bottom surface 11 and the removable portion 20, respectively. Thus, the removable portion 20 no longer mechanically or structurally connects to the base portion 10, and falls away from the base portion 10 to create opening 35. For example, the thickness of the bottom surface 11 proximate or adjacent to the track 25 may be thin (e.g. may taper to a smaller thickness proximate the track 25). Because the cross-section of the bottom surface 11 proximate or adjacent to the track 25 is thin, the shearing force of the track 25 as it is pulled away from the bottom surface 11 and removable portion 20 along the perimeter of the removable portion 20 is large enough to mechanically disengage (e.g. break apart) the track 25 from the bottom surface 11. The cross-section of the bottom surface 11 proximate the track 25 may be any geometrical configuration. Likewise, the thickness of the removable portion 20 proximate or otherwise near the perimeter of the removable portion 20 (i.e. adjacent to the track 25) may be thin (e.g. may taper to a smaller thickness proximate an outer edge of the removable portion 20). Because the cross-section of the removable portion 20 proximate or otherwise near the track 25 is thin, the shearing force of the track 25 as it is pulled away from the bottom surface 11 and the removable portion 20 along the perimeter of the removable portion 20 is large enough to mechanically disengage (e.g. break apart) the track 25 from the removable portion 20. The cross-section of the removable portion 20 proximate the track 25 may be any geometrical configuration. Therefore, when the track 25 is in motion, for example by gripping and pulling either the track 25 or the actuator 26, the thin surfaces of the bottom surface 11 and the removable portion 20 are fractured, sheared, snapped, broken apart, etc., releasing the removable portion 20 from the track 25 which results in the releasing of the removable portion 20 from the rest of the bottom surface 11. Opening 35 is now created in the base portion 10 to facilitate mounting the enclosure 100 at a particular location requiring access through the bottom of the enclosure 100.

Figure 6:
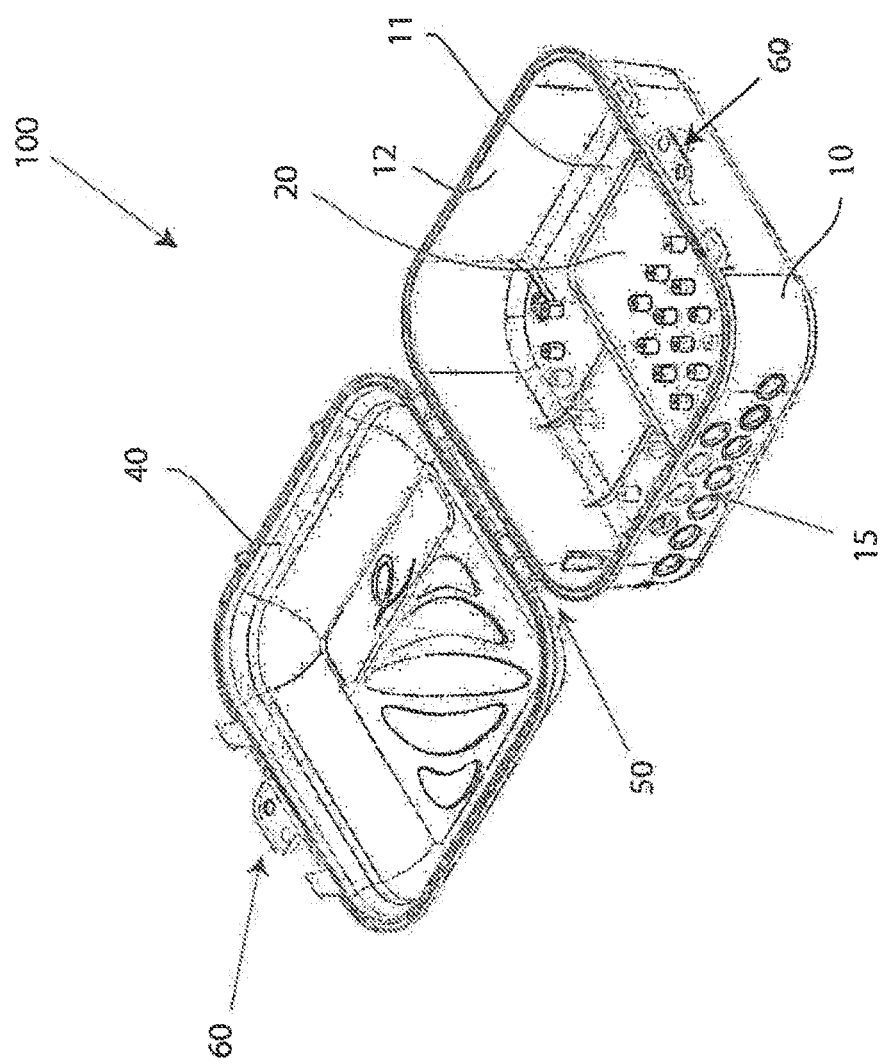
FIG. 6 depicts a perspective view of the first embodiment in an open position.

With reference now to FIG. 6, and additional reference to FIG. 1, embodiments of enclosure 100 may include a cover portion 40. The cover portion 40 may be operably connected to the base portion 10. The cover portion 40 may be hingedly connected to the base portion 10 through connection means 50. However, the cover portion 40 may be connected to the base portion 10 other than through a hinged connection, such as connection means 50. For instance, the cover portion 40 may be configured to snap on the base portion 10. Those skilled in the art should appreciate that the cover portion 40 may be operably connected to the base portion 10 through various fasteners, devices, methods, etc. Moreover, the cover portion 40 should be sized and dimensioned to completely or substantially cover the base portion 10 when in the closed position (shown in FIG. 1). For example, the perimeter of the cover portion 40 should be approximately the same size or slightly larger than the base portion 10 to form an enclosure 100 when the cover portion 40 is in the closed position (i.e. placed over the base portion 10). Moreover, the cover portion 40 may be flat or have a curvilinear surface to increase the volume of the enclosure 100 when in the closed position. Various configurations of the cover portion 40 may be implemented to form an enclosure 100 through a union with the base portion 10. The cover portion 40 may be comprised of the same materials as the base portion 10, or may be comprised of a different material depending on the required strength of the enclosure 100. For instance, the cover portion 40 may comprise molded plastic, composites, metal, or a combination of known materials. For example, the cover portion 40 may include metallic components attached to or integrated with the overall molded plastic structure.

Embodiments of enclosure 100 may also include a locking means 60 to secure the cover portion 40 to the base portion 10. For instance, locking means 60 may securably join the cover portion 40 and the base portion 10 together to prevent unauthorized access to the transmission lines and other electronic/broadband equipment housed within enclosure 100. The locking means 60 may include known fasteners such as clips, hooks, clamps, snaps, and the like. Furthermore, locking means 60 may be configured to cooperate with standard locking devices, such as a loop to accommodate a combination lock, and professional locking devices/tools, such as a cable termination tool. Those having ordinary skill in the art should appreciate that various locking means may be used to secure the enclosure 100 in the closed position.

Figure 7A:
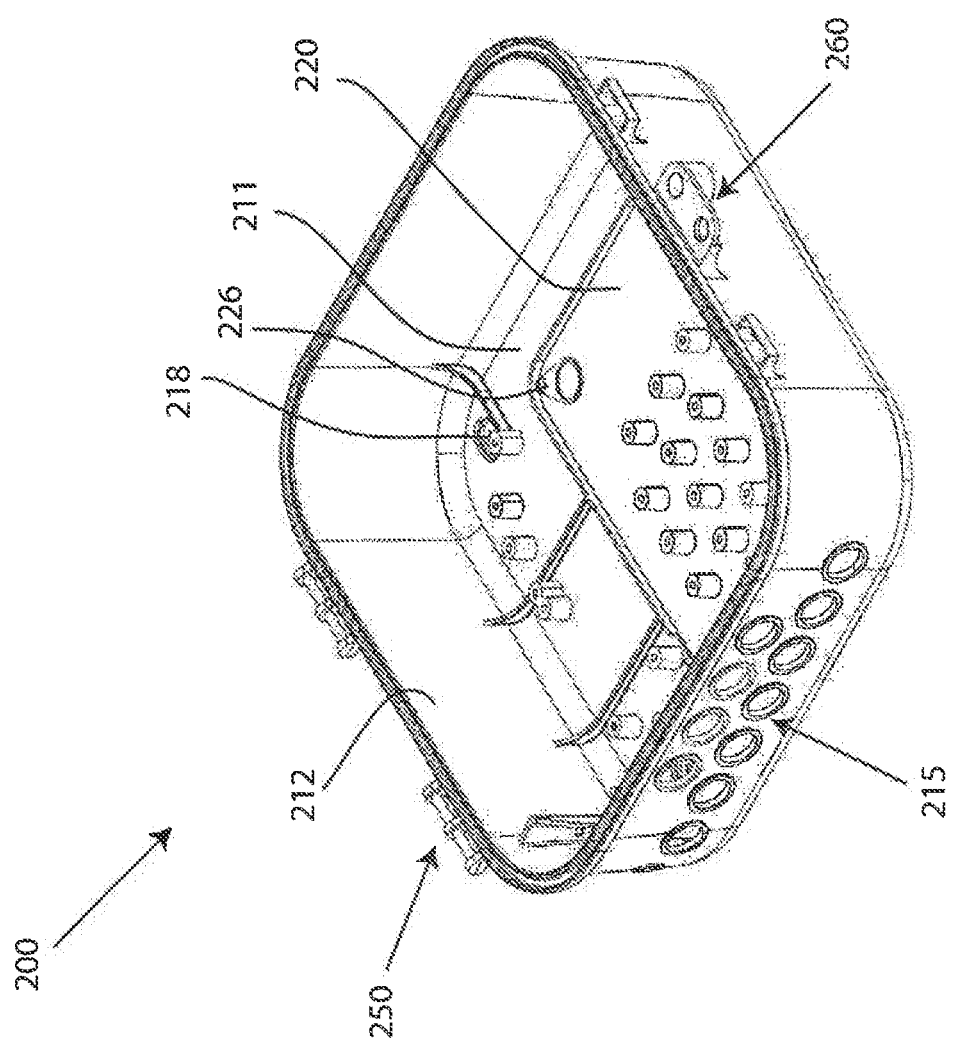
FIG. 7A depicts a perspective view of a second embodiment of the enclosure.

With continued reference to the drawings, FIGS. 7A and 7B depict an embodiment of enclosure 200. The enclosure embodiment 200 may include a base portion 210 and a cover portion 240 (not shown). The base portion 210 may include a bottom surface 211, a wall 212, a plurality of openings 215, and a removable portion 220. Embodiments of enclosure 200 may further include a connection means 250 to operably attach the cover portion 240 to the base portion 210, and a locking means 260 to secure the enclosure 200 in a closed position. Enclosure 200 may have several similar features with enclosure embodiment 100. For example base portion 210, plurality of openings 215, cover portion 240, mounting holes 218, connection means 250, and locking means 260 may share the same structural and functional aspects as those components associated with enclosure 100. However, the embodiment of the enclosure 200 may include a removable portion 220. Embodiments of a removable portion 220 may have some similarities to the removable portion 20, but may include additional or different structural and/or functional aspects. The removable portion 220 of the base portion 210 may be removed, peeled away, discarded, eliminated, extracted, etc. from the bottom surface 211 of the base portion 210 to create an opening 235 in the bottom surface 211. The opening 235 (as shown in FIG. 8) created when a portion of the bottom surface 211 is removed may provide the necessary clearance for any existing hardware, connections, and various ports which may be located on a structure when mounting the enclosure 200 to the structure.

Figure 9:
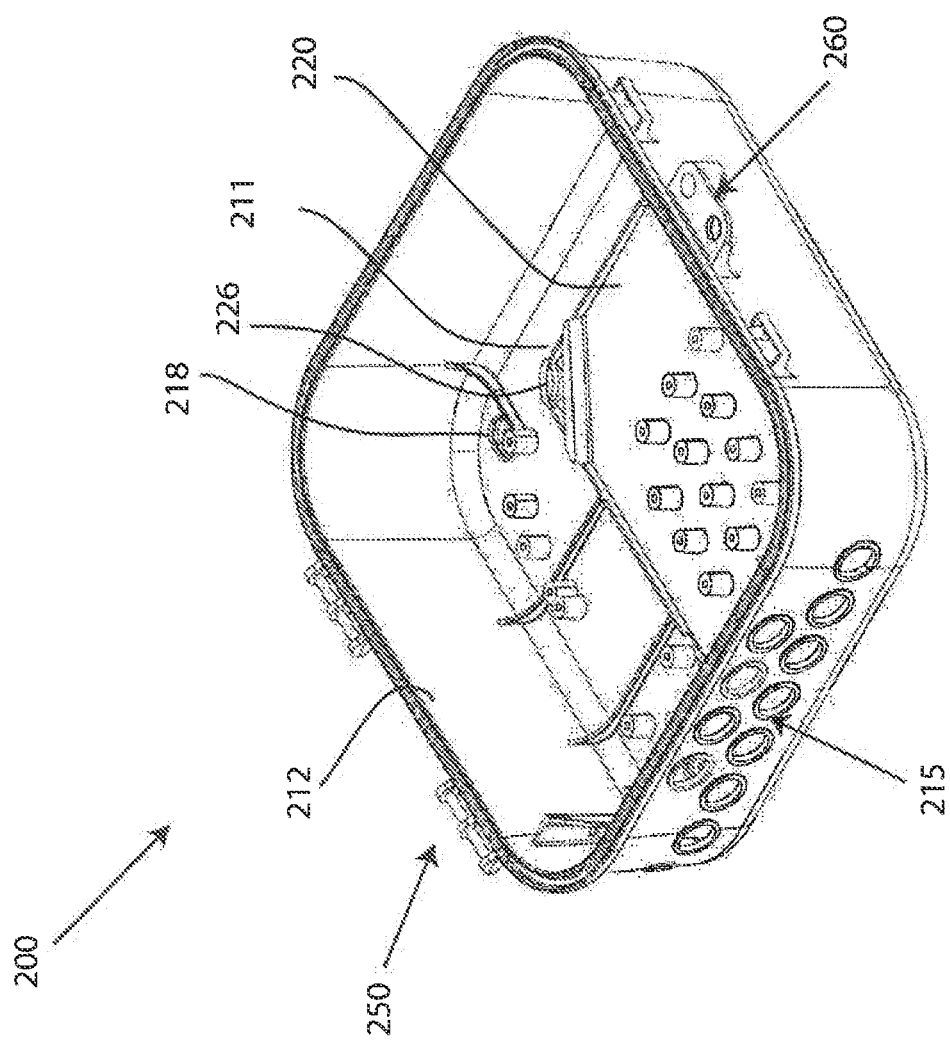
FIG. 9 depicts a perspective view of the second embodiment of the enclosure while the removable portion is partially removed.

Embodiments of a removable portion 220 may include an actuator 226, such as a pull tab or comparable device, operably attached to the removable portion 220. The actuator 226 may be mechanically attached/connected to the removable portion 220 proximate or otherwise near a corner of the removable portion 220. Through actuation of the actuator 226, the removable portion 220 may peel away or fall from the base portion 210 because the force/stress exerted by the displacement of the removable portion 220 severs a thin structural or mechanical bond between the bottom surface 211 and the removable portion 220. Thus, the removable portion 220 no longer mechanically or structurally connects to the base portion 210, and falls away from the base portion 210 to create opening 235. For example, the thickness of the bottom surface 211 surrounding or substantially surrounding the removable portion 220 may be thin (e.g. may taper to a smaller thickness proximate the perimeter of the removable portion 220). Likewise, the thickness of the removable portion 220 proximate or otherwise near the perimeter, or an outer edge, of the removable portion 220 may also be thin (e.g. may taper to a smaller thickness proximate the outer edge of the removable portion 220). Because the cross-section of the base portion 210 between the removable portion 220 and the bottom surface 211 is thin, the shearing force generated by the displacement of the removable portion 220 as it is pulled away from the bottom surface 211 is large enough to mechanically disengage (e.g. break apart) the removable portion 220 from the bottom surface 211. The cross-section of the base portion 210 between the removable portion 220 and the bottom surface 211 may be any geometrical configuration. Therefore, when the actuator 226 is pulled, the thin surface, or thin cross-section, between the bottom surface 211 and the removable portion 220 is fractured, sheared, snapped, severed broken apart, etc., releasing the removable portion 220 from the rest of the bottom surface 211. Opening 235 is now created in the base portion 210 to facilitate mounting the enclosure 200 at a particular location requiring access through the bottom of the enclosure 200. Those having skill in the art should appreciate that actuation of the actuator 226 may include an initial actuation of the actuator 226 toward a corner of the removable portion 220 to cause an initial break from the bottom surface 211; the actuator 226 may then be pulled in the reverse direction to peel the removable portion 220 away from the bottom surface 211, as shown in FIG. 9.

Figure 10:
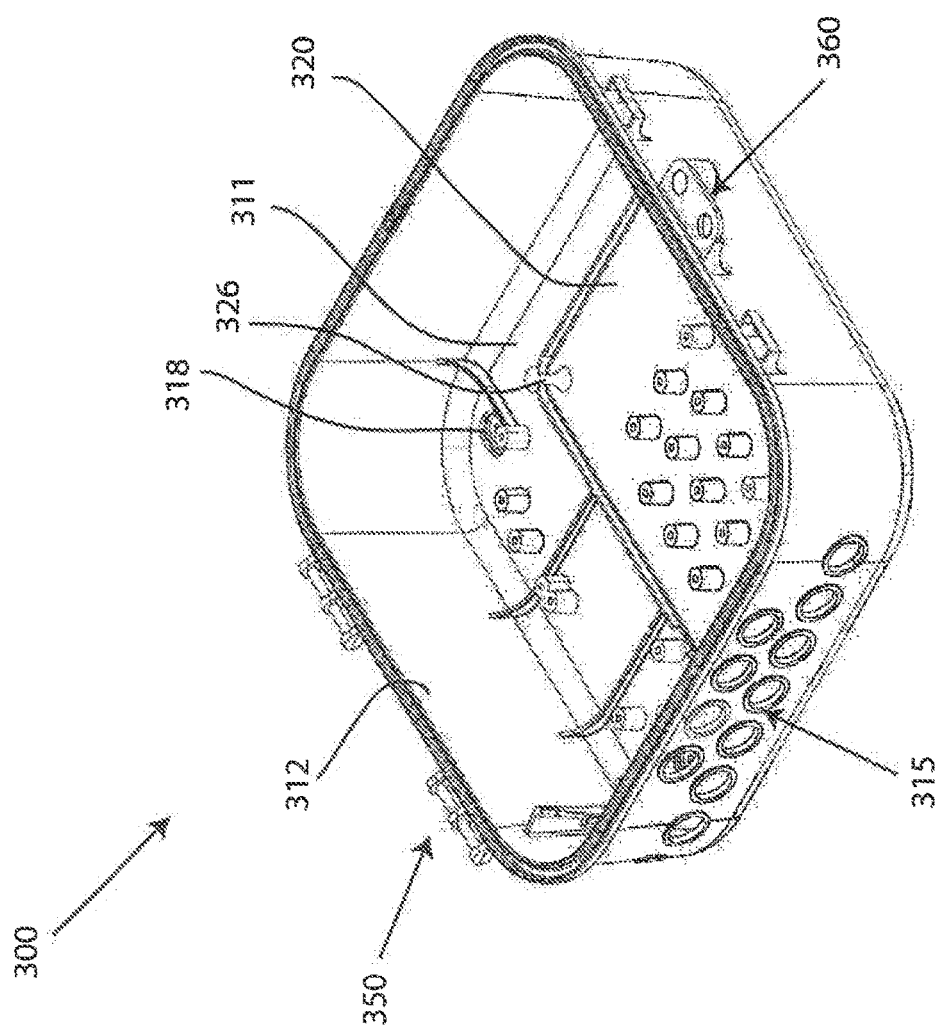
FIG. 10 depicts a perspective view of a third embodiment of the enclosure.
Figure 11:
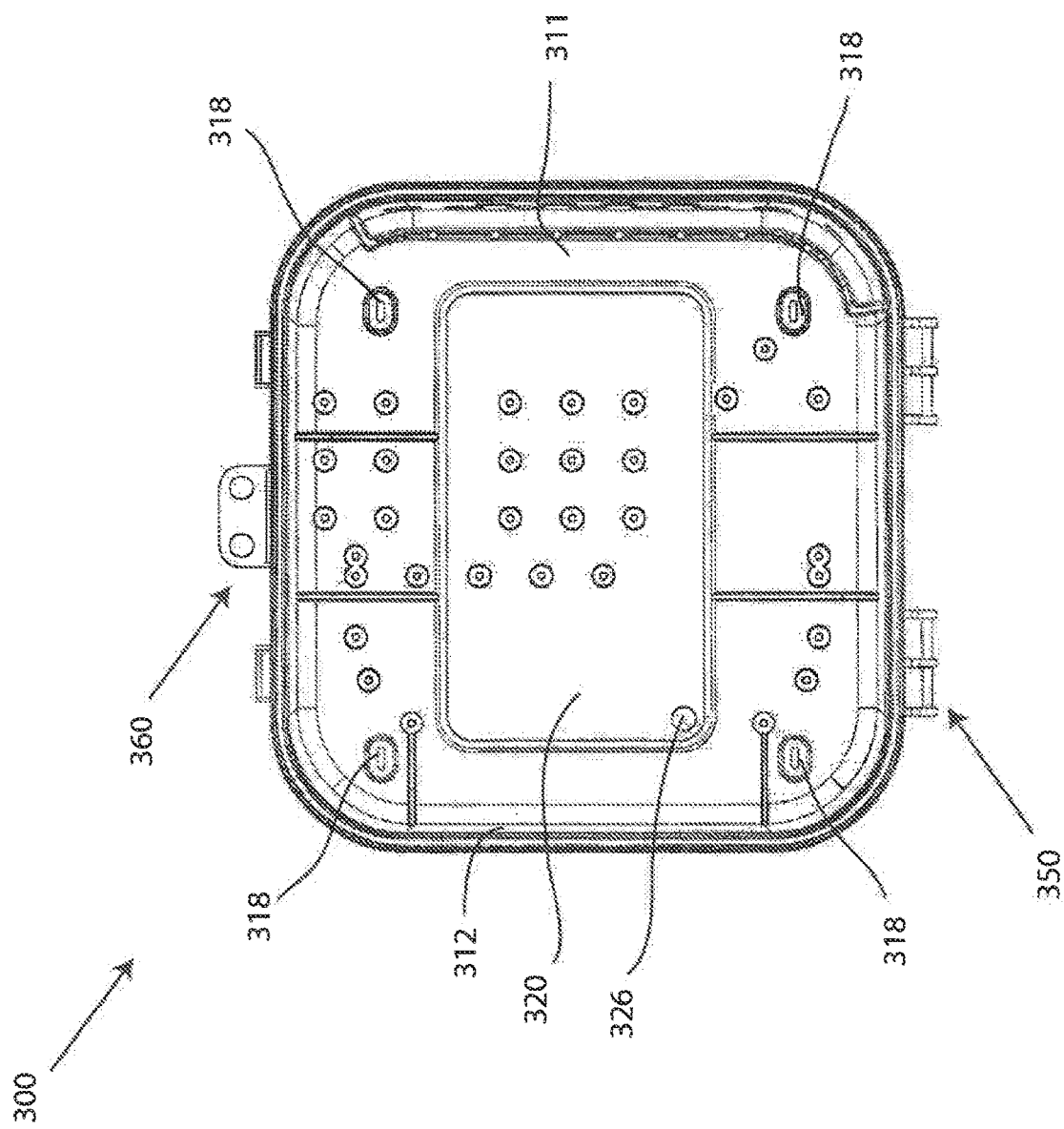
FIG. 11 depicts a top view of the third embodiment of the enclosure.
Figure 12:
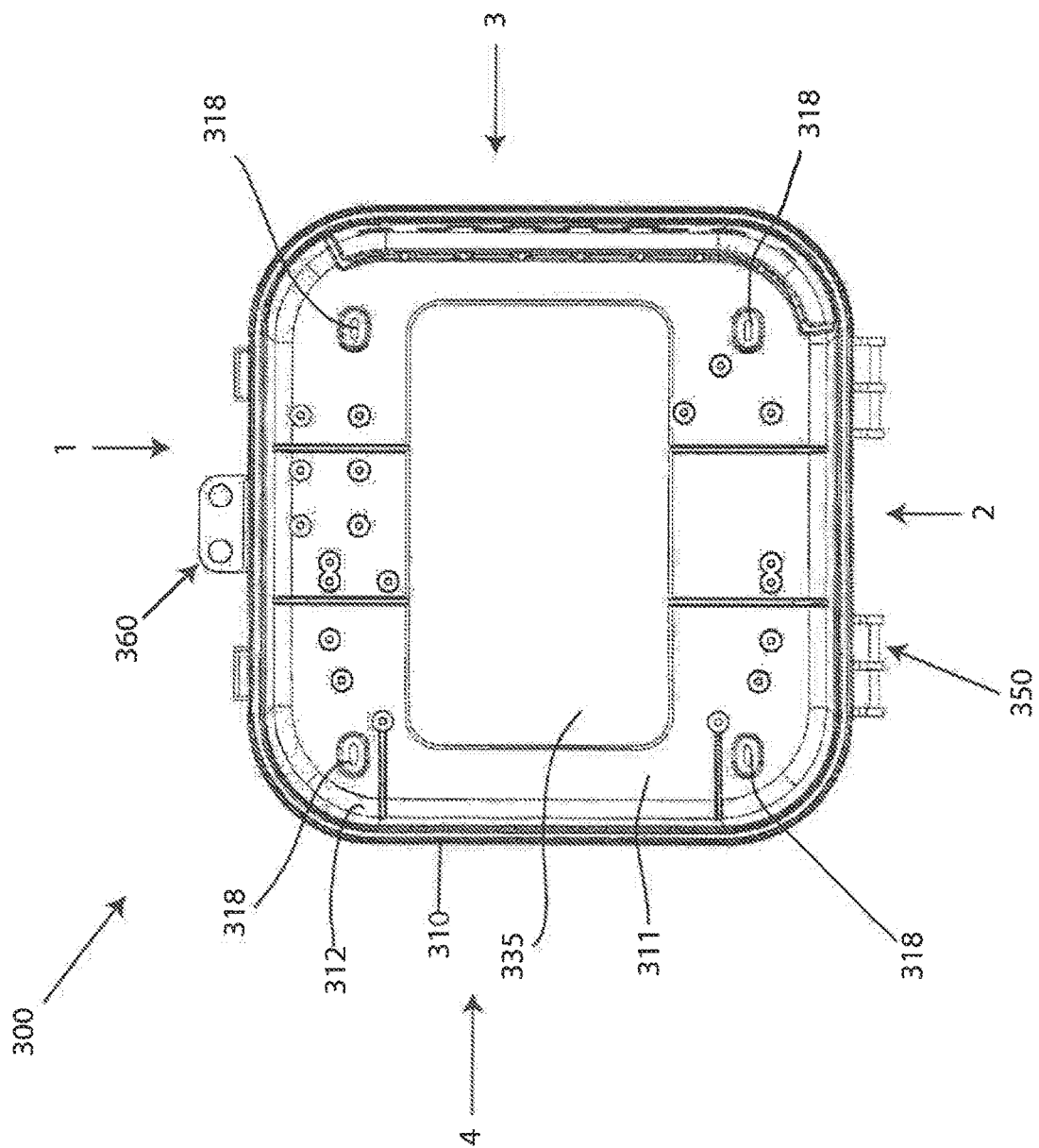
FIG. 12 depicts a top view of the third embodiment of the enclosure after the removable portion has been removed.

Referring now to FIGS. 10 and 11, an embodiment of enclosure 300 is depicted. The enclosure embodiment 300 may include a base portion 310 and a cover portion 340 (not shown). The base portion 310 may include bottom surface 311, a wall 312, a plurality of openings 315 and a removable portion 320. Embodiments of enclosure 300 may further include a connection means 350 to operably attach the cover portion 340 to the base portion 310, and a locking means 360 to secure the enclosure 300 in a closed position. Enclosure 300 may have several similar features with enclosure embodiment 100. For example base portion 310, plurality of openings 315, cover portion 340, mounting holes 318, connection means 350, and locking means 360 may share the same structural and functional aspects as those components associated with enclosure 100. However, the embodiment of the enclosure 300 may include a removable portion 320. Embodiments of a removable portion 320 may be peeled away from a bottom surface 311 of the base portion 310 in a similar manner as the removable portion 220, but may include actuator 326. For example, a thin section between the removable portion 320 and the bottom surface 311 may be severed by the displacement of the removable portion 320. Thus, removable portion 320 of the base portion 310 may be removed, peeled away, discarded, eliminated, extracted, etc. from the bottom surface 311 of the base portion 310 to create an opening 335 in the bottom surface 311. The opening 335 (as shown in FIG. 12) created when a portion of the bottom surface 311 is removed may provide the necessary clearance for any existing hardware, connections, and various ports which may be located on a structure when mounting the enclosure 300 to the structure.

Figure 13:
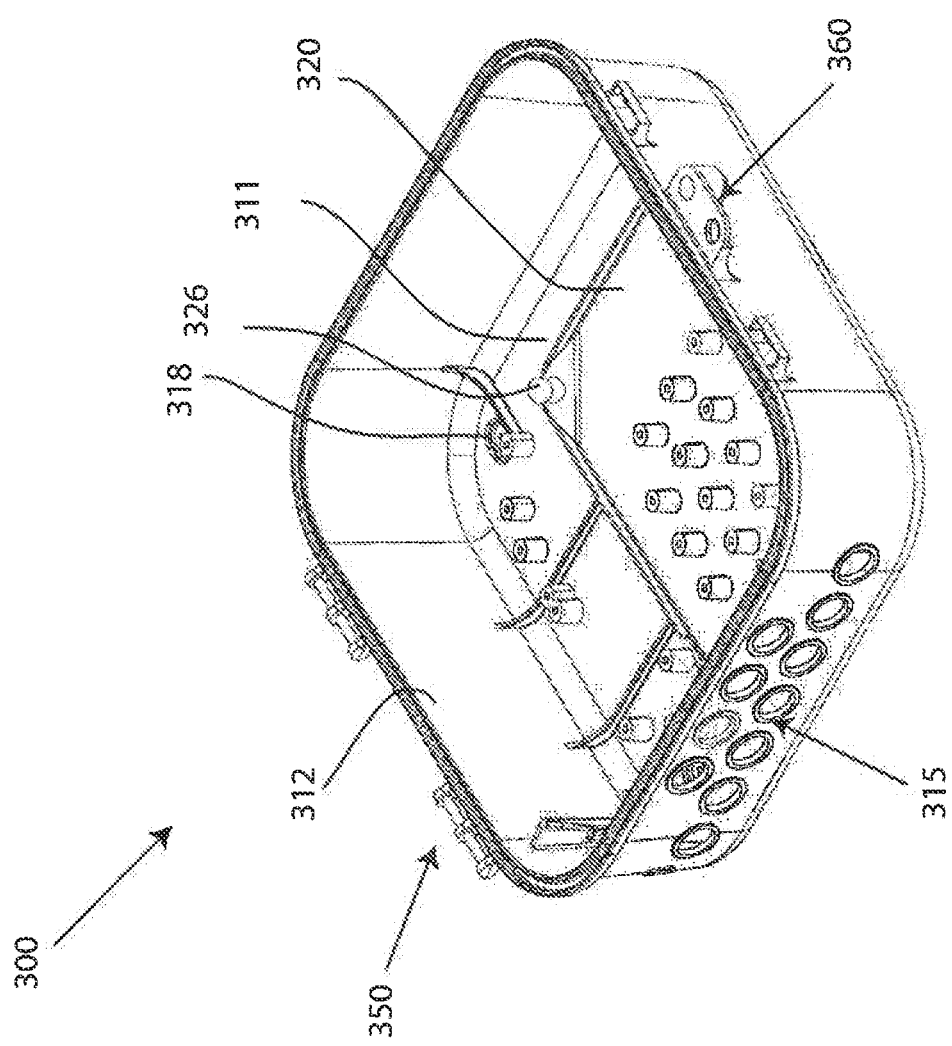
FIG. 13 depicts a perspective view of the third embodiment of the enclosure while the removable portion is partially removed.

Embodiments of enclosure 300 may include a removable portion 320 having an actuator 326. Actuator 326 may be mechanically attached to the removable portion 320 through fasteners, bonding agents, etc., or may be structurally integral with the removable portion 320. The actuator 326 may be disposed proximate or otherwise near a corner of the removable portion 320. Moreover, actuator 326 may protrude a distance from the removable portion 320, and may be stationary (e.g. does not hinge forward or backward). In other words, actuator 326 does not require an initial actuation toward the corner of the removable portion 320; actuator 326 may simply be gripped and pulled in a direction opposite the corner of its location on the removable portion 320, as shown in FIG. 13.

Referring now to FIGS. 1-13, embodiments of a method of creating an opening 35 in a configurable enclosure 100 may include the steps of providing an enclosure 100 having a cover portion 40 operably attached to a base portion 10, the base portion 10 including a wall 12 disposed around a perimeter of a bottom surface 11, disposing a track 25 on the bottom surface 11 of the base portion 10, the track 25 substantially surrounding a removable portion 20 of the bottom surface 11, and reducing a thickness of the bottom surface 11 proximate an outer edge of the removable portion 20, wherein the track 25 is configured to be peeled away from the bottom surface 11 to release the removable portion 20 and create an opening 35 in the base portion 10.

Moreover, embodiments of a method of creating an opening 235, 335 in a configurable enclosure 200, 300 may include the steps of providing an enclosure 200, 300 having a cover portion 240, 340 operably attached to a base portion 210, 310, the base portion 210, 310 including a wall 212, 312 disposed around a perimeter of a bottom surface 211, 311, disposing an actuator 226, 326 on a removable portion 220, 320 of the bottom surface 211, 311 of the base portion 210, 310, and reducing a thickness of the bottom surface 211, 311 proximate a outer edge of the removable portion 220, 320, wherein the actuator 226, 326 is configured to be pulled to peel away the removable portion 220, 320 and create an opening 235, 335 in the base portion 210, 310.

Referring now to FIGS. 18-23, another embodiment of an enclosure 400 may be a configurable enclosure, a terminal box, a cable box shield, a cable box, a junction box, a service box, and the like. Enclosure 400 may be used to house, enclose, shield, cover, protect, etc., various devices associated with broadband communications, including transmission lines, such as coaxial cables, optical fibers, and the like, splitters, switches, electrical wiring, and other specialized electronic and/or communication equipment. Moreover, enclosure 400 may be externally mounted to a structure during installation of cable service or other broadband communication service.

The enclosure 400 may include a base portion 410 and a cover portion (not shown). The cover portion may be similar to the cover portion 40 described above and may include a locking means to secure the cover portion to the base portion, as described above. The base portion 410 may include a plurality of openings 415, a first removable portion 420, and a second removable portion 430. The first removable portion 420 is smaller than the second removable portion 430 and is disposed within the second removable portion 430 on the base portion 410. That is, the second removable portion 430 includes the first removable portion 420. As shown, the first removable portion 420 has two edges 422, 424 that are shared with portions of two edges 432, 434 of the second removable portion 430.

Embodiments of enclosure 400 may further include a connection assembly 450 to operably attach the cover portion to the base portion 410, and a locking means 460 to secure the enclosure 400 in a closed position. Other embodiments of the enclosure 400 may include a cover portion operably attached to a base portion 410. The base portion 410 includes a wall 412 disposed along a perimeter of a bottom surface 411 and a removable portion 420 of the bottom surface 411 configured to be peeled away from the base portion 410 to create an opening through the bottom surface 411. Embodiments of the enclosure 400 may also include a cover portion operably attached to a base portion 410. The base portion 410 includes a wall 412 disposed along a perimeter of a bottom surface 411 and a mechanism for peeling away a portion of the bottom surface 411 of the base portion 410.

The base portion 410 may include a bottom surface 411 and a wall 412. The wall 412 may be a wall, side, edge, side wall, barrier, and the like, having a certain height extending upwards from the bottom surface 411. The wall 412 may extend along a perimeter of the bottom surface 411, wherein the wall 412 is structurally integral with the bottom surface 411 (e.g. the bottom surface 411 and the wall 412 may be molded as a single structural component). The bottom surface 411 may be many different shapes, such as a rectangle, square, circle, etc. which may determine the overall shape and configuration of the enclosure 400. Thus, the enclosure 400 may be a square enclosure, a rectangular enclosure, a circular enclosure, or any polygonal enclosure. The height of the wall 412 can determine a depth of the enclosure 400, with respect to the base portion 410. Likewise, the height of the wall 412 in conjunction with the surface area of the bottom surface 411 may determine the volume of the base portion 410. The base portion 410 may be comprised of molded plastic, composites, metal, or a combination of materials. For example, the base portion 410 may include metallic components attached to or integrated with the overall molded plastic structure.

Positioned somewhere on the bottom surface 411 may be at least one mounting hole 418. The mounting hole 418, or the plurality of the mounting holes 418, may be a means to secure, mount, affix, etc., the enclosure 400 to a structure. Embodiments of the enclosure 400 may include the mounting holes 418 proximate or otherwise near each corner of the base portion 410. The mounting holes 418 may accept various fasteners, such as screws, to fasten the enclosure 400 to a structure or other rigid body, such as a pole. Additionally, a plurality of pegs may be placed within the base portion 410 to assist the arrangement and operable placement of transmission lines and/or other equipment (e.g., communications equipment) inside the enclosure 400. The pegs may upwardly protrude from the bottom surface 411 a distance, generally shorter than the height of wall 412 of the base portion 410; however, the pegs may protrude further than the height of the wall 412 if the cover portion is dimensioned to add volume to the enclosure 400 when in a closed position. The wall 412 may include one or more openings, as discussed with respect to the above embodiments, to provide clearance for transmission lines, line wiring, load wiring, electrical wires, and other telecommunication paths to enter the enclosure 400 and interact with the equipment and lines located within the enclosure 400.

With continued reference to FIGS. 18-23, the first and second removable portions 420, 430 of the base portion 410 can be removed without the use of tools or other items associated with punching out and/or cutting away a portion of an enclosure, such as enclosure 400. For example, the first and second removable portions 420, 430 may be removed, peeled away, discarded, eliminated, extracted, etc. from the bottom surface 411 of the base portion 410 to expose the internals of the enclosure 400. In other words, a portion of the bottom surface 411 of the base portion 410 may be removed, or peeled away, to create an opening in the bottom surface 411 (e.g. by the removal and displacement of the first removable portion 420 or the second removable portion 430 of the base portion 410). The opening (as shown in FIG. 5) created when a portion of the bottom surface 411 is removed may provide the necessary clearance for any existing hardware, connections, and various ports which may be located on a structure when mounting the enclosure 400 to the structure. For instance, a technician may need to install an enclosure 400 at a location on the outer wall of the structure where existing hardware is fixedly mounted. Instead of wielding a knife and hammer to carve out a portion of the bottom surface of an enclosure to clear the existing hardware, the technician may remove, peel away, tear away, etc., without tools, the first removable portion 420 or the second removable portion 430 from the enclosure 400 without risking injury to themselves or damage to the enclosure 400.

Removing the first removable portion 420 from the enclosure 400 involves peeling away a first track 425 positioned on the bottom surface 411 of the base portion 410 to release a portion of the bottom surface 411 from the base portion 410. The portion of the bottom surface 411 being released from the base portion 410 after the track 425 has been peeled away may be referred to as the removable portion 420. The size of the removable portion 420 may vary, and may be determined at the time of manufacturing. The size of the track 425 should correspond to the size of the desired removable portion 420. The track 425 may be located proximate or otherwise near the perimeter of the removable portion 420, and extend around or substantially around the perimeter of the removable portion 420. In other words, the track 425 may be disposed on the bottom surface 411 of the base portion 410, around the removable portion 420, which may help identify the removable portion 420. The track 425 may include an actuator 426, such as a pull tab, which may facilitate the removal of the track 425. For instance, a user may push the actuator 426 from the inside of the enclosure 400 through the bottom surface 411 such that the actuator 426 protrudes from the track 425 and can be gripped from a back side surface 413 of bottom surface 411. From the back side surface 413 of the bottom surface 411, the user can then pull the actuator 426 in a direction away from the back side surface 413 to peel away the track 425 from the base portion 410 in a counter-clockwise direction.

Similarly, removing the second removable portion 430 from the enclosure 400 involves peeling away a second track 435 positioned on the bottom surface 411 of the base portion 410 to release a portion of the bottom surface 411 from the base portion 410. The portion of the bottom surface 411 being released from the base portion 410 after the track 435 has been peeled away may be referred to as the second removable portion 430. The size of the removable portion 430 may vary, and may be determined at the time of manufacturing. The size of the track 435 should correspond to the size of the desired removable portion 430. The track 435 may be located proximate or otherwise near the perimeter of the removable portion 430, and extend around or substantially around the perimeter of the removable portion 430. In other words, the track 435 may be disposed on the bottom surface 411 of the base portion 410, around the removable portion 430, which may help identify the removable portion 430. The track 435 may include an actuator 436, such as a pull tab, which may facilitate the removal of the track 435. For instance, a user may push the actuator 436 from the inside of the enclosure 400 through the bottom surface 411 such that the actuator 436 protrudes from the track 425 and can be gripped from a back side surface 413 of bottom surface 411. From the back side surface 413 of the bottom surface 411, the user can then pull the actuator 436 in a direction away from the back side surface 413 to peel away the track 435 from the base portion 410 in a clockwise direction.

Figure 20:
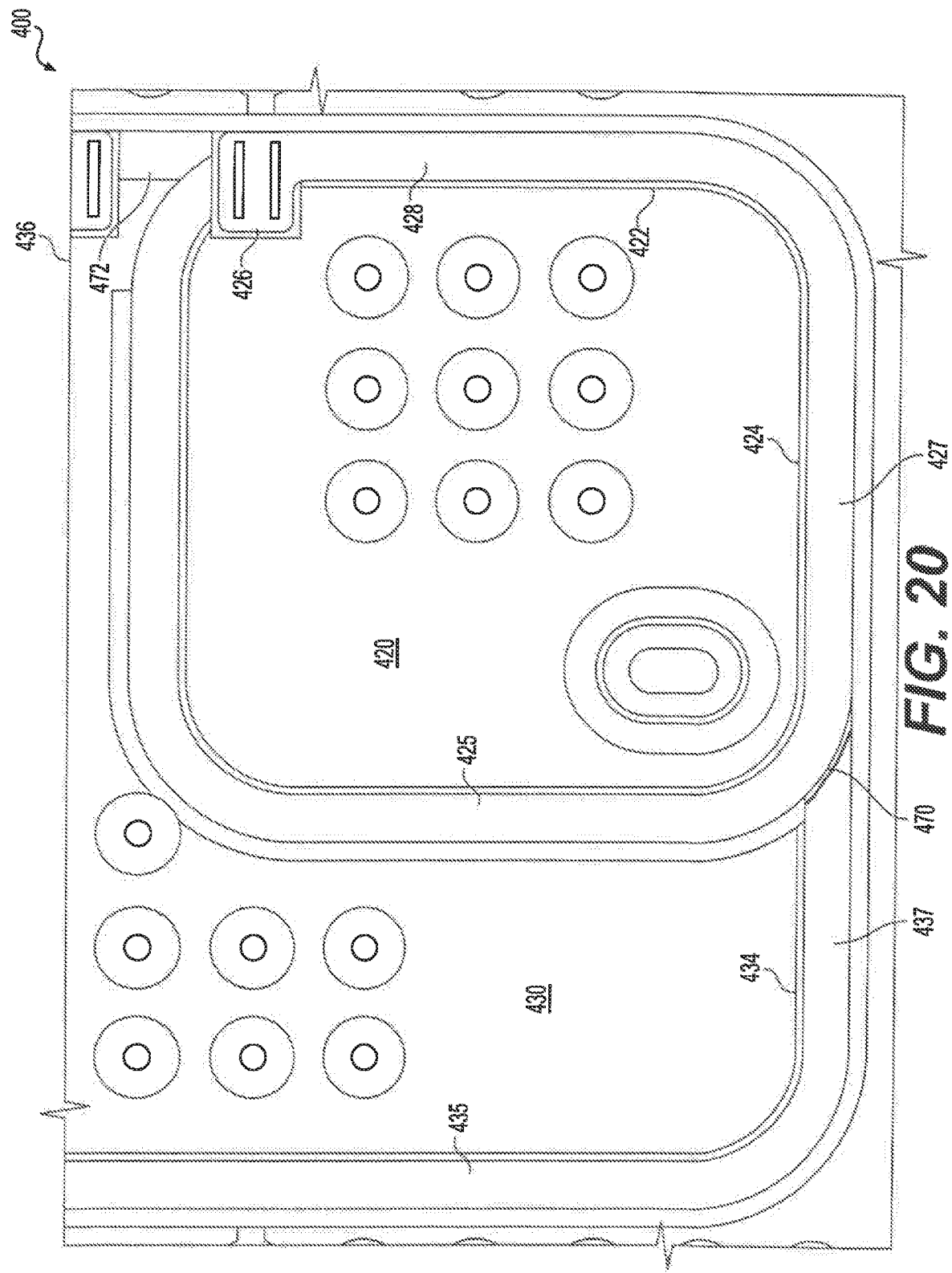
FIG. 20 is an enlarged top view of a portion of the base of the enclosure of FIG. 18.
Figure 21:
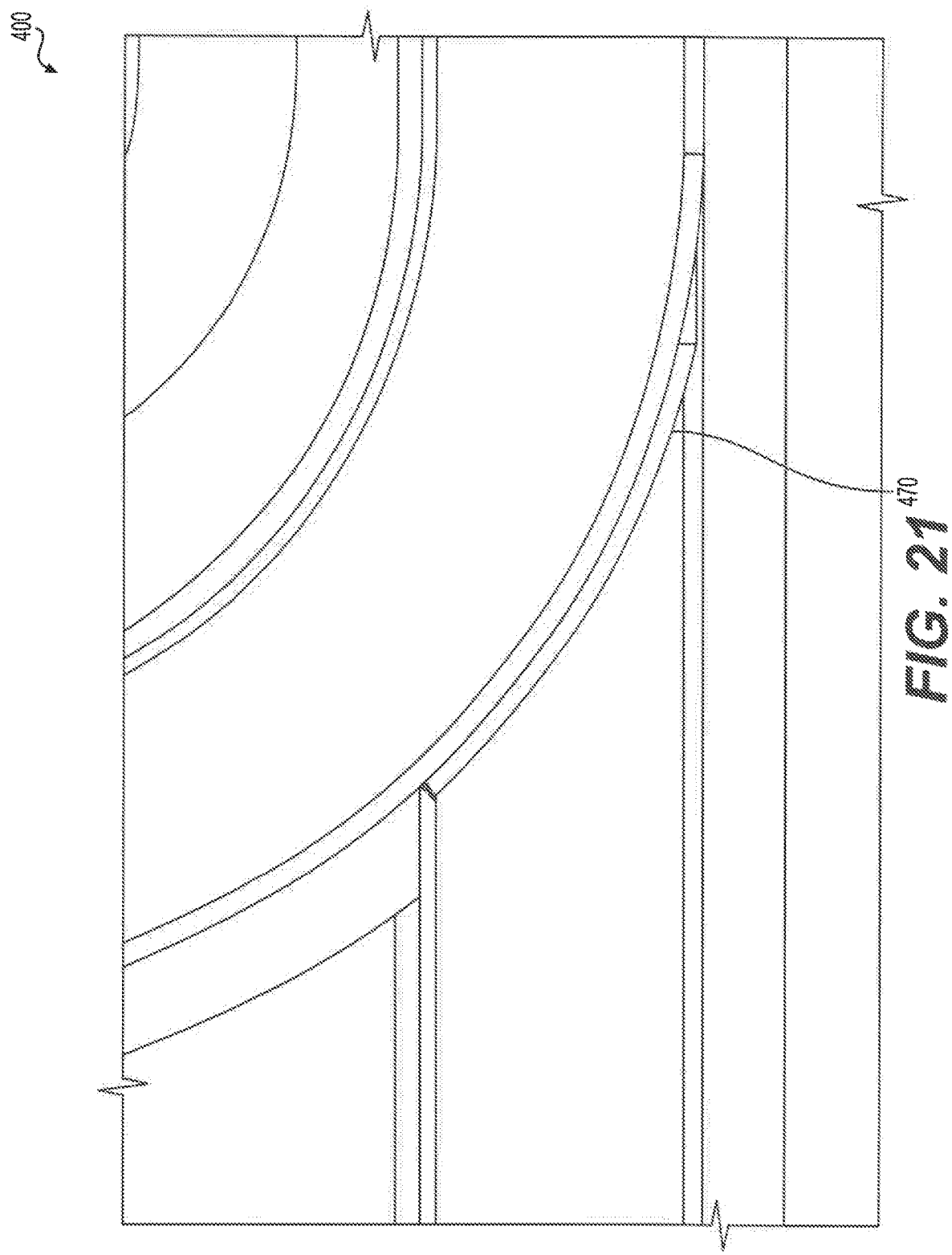
FIG. 21 is a further enlarged top view of the portion of the base of the enclosure of FIG. 20.
Figure 22:
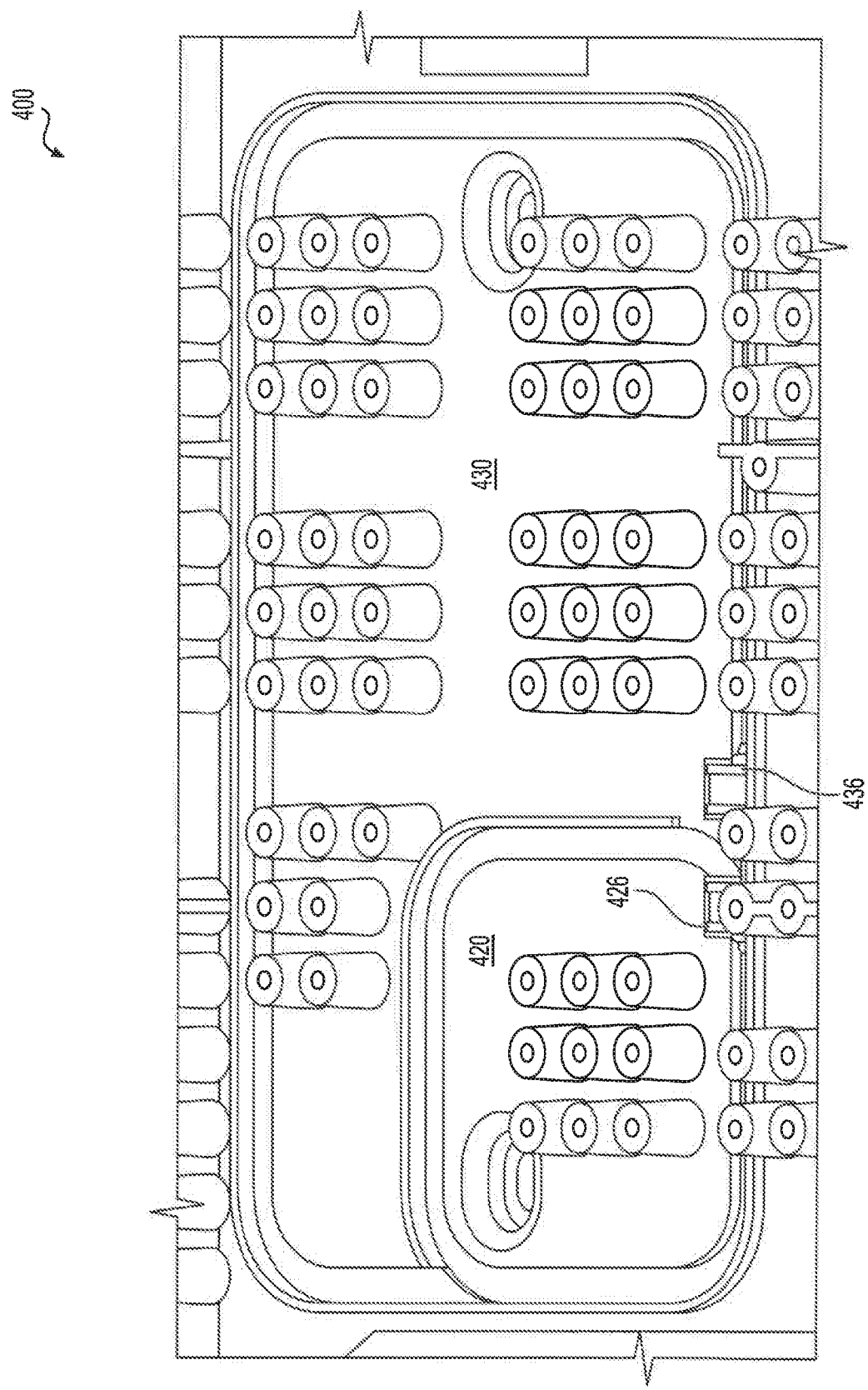
FIG. 22 is a perspective view of a portion of the base of the enclosure of FIG. 18.

Referring now to FIGS. 20 and 21, the first removable portion 420 has two edges 422, 424 that are shared with portions of two edges 432, 434 of the second removable portion 430, as discussed above. Accordingly, the first track 426 includes a first portion 427 that is aligned with a first portion 427 of the second track 435 and a second portion 428 aligned with a second portion 438 of the second track 435. The first portion 427 is separated from the first portion 437 by a void 470 in material. For example, the void 470 forms a curved slit between the first portion 427 and the first portion 437. The tracks 425, 435 substantially surround the respective removable portions 420, 430 of the bottom surface 411, wherein the tracks 425, 435 are attached to a thin portion of the bottom surface 411, wherein when the tracks 425, 435 are configured to be peeled away from the bottom surface 411, the removable portions 420, 430 are released from the base portion 410.

Figure 23:
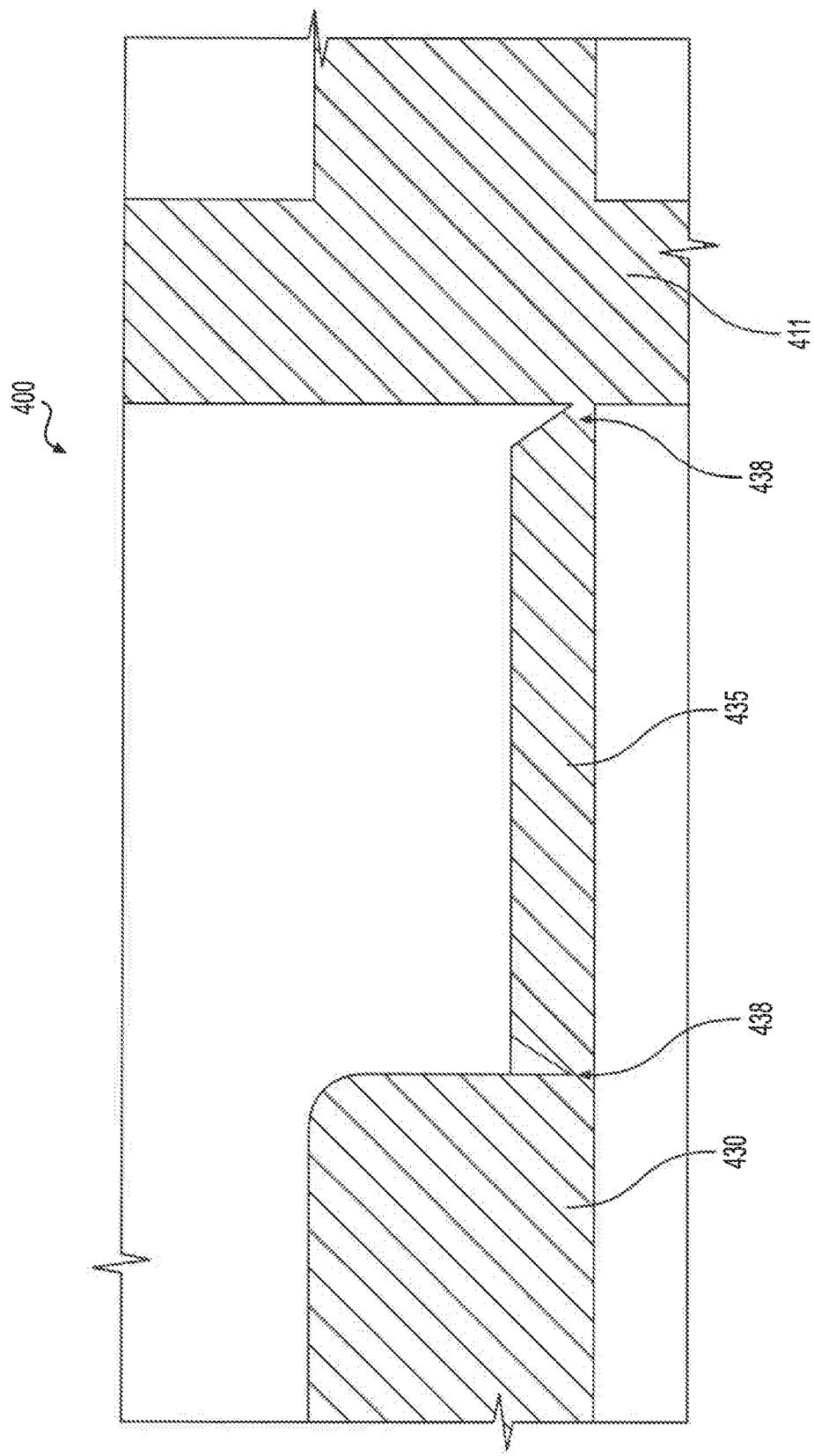
FIG. 23 is a cross-sectional view along line XXIII-XXIII of FIG. 18.

With reference to FIG. 23, the removal or peeling away of the track 435 is facilitated by weakened portions, for example, thinned regions 438 of the bottom surface 411, on each side of the track 435 that cause the removable portion 430 to peel away or fall from the base portion 410 because the force/stress exerted by the movement of the track 435 severs a thin structural or mechanical bond of the thinned regions 438 between the track 435 and the bottom surface 411 and the removable portion 430, respectively. Thus, once the thinned regions 438 are severed, the removable portion 430 no longer mechanically or structurally connects to the base portion 410, and falls away from the base portion 410 to create an opening. For example, the thickness of the bottom surface 411 proximate or adjacent to the tracks 425, 435 may be thin (e.g. may taper to a smaller thickness proximate the tracks 425, 435) at the thinned regions 438. Similarly, the removal or peeling away of the track 425 is facilitated by weakened portions, for example, thinned regions of the bottom surface 411, on each side of the track 425.

Because the cross-section of the bottom surface 411 proximate or adjacent to the tracks 425, 435 is thin, the shearing force of the tracks 425, 435 as they are pulled away from the bottom surface 411 and the respective removable portion 420, 430 along the perimeter of the removable portion 420, 430 is large enough to mechanically disengage (e.g. break apart) the track 425, 435 from the bottom surface 411. The cross-section of the bottom surface 411 proximate the tracks 425, 435 may be any geometrical configuration. Likewise, the thickness of the thinned region 438 proximate or otherwise near the perimeter of the removable portions 420, 430 (i.e. adjacent to the tracks 425, 435) may be thin (e.g. may taper to a smaller thickness proximate an outer edge of the removable portions 420, 430). Because the cross-section of the thinned region 438 proximate or otherwise near the tracks 425, 435 is thin, the shearing force of the tracks 425, 435 as they are pulled away from the bottom surface 411 and the removable portions 420, 430 along the perimeter of the removable portions 420, 430 is large enough to mechanically disengage (e.g. break apart) the tracks 425, 435 from the removable portions 420, 430. The cross-section of the removable portions 420, 430 proximate the tracks 425, 435 may be any geometrical configuration. Therefore, when the tracks 425, 435 are in motion, for example by gripping and pulling either the track 425, 435 or the actuator 426, 436, the thinned region 438 between the bottom surface 411 and the removable portion 420, 430 are fractured, sheared, snapped, broken apart, etc., releasing the removable portion 420, 430 from the track 425, 435 which results in the releasing of the removable portion 420, 430 from the rest of the bottom surface 411. An opening is then created in the base portion 410 to facilitate mounting the enclosure 400 at a particular location requiring access through the bottom of the enclosure 400.

When a user wants to remove only the smaller first removable portion 420, the user pulls the actuator 426 and tears away the first track 425 in a counter-clockwise direction, when pulled from the back side surface 413 of the enclosure 400. The void 470 permits the first removable portion 420 to cleanly fall away from the enclosure 400 and the second removable portion 430 when the first track 425 is completely peeled away. When a user wants to remove the larger second removable portion 430 (which includes the first removable portion), the user pulls the actuator 436 and tears away the second track 436 in a clockwise direction, when pulled from the back side surface 413 of the enclosure 400. The void 470 prevents the second track 436 from continuing to tear away the first track 425 and thus second removable portion 430 remains connected to the bottom surface 411 and the first removable portion 420. In order to complete removal of the second removable portion 430, the user can then tear away the first track 425 as described above. After removal of the first track 425, the second removable portion 430 may remain connected to the bottom surface 411 by a connection portion 472 disposed between the actuators 426, 436. The connection portion 472 can be torn away from the bottom surface 411 along the thinned region 438 that is adjacent to the bottom surface 411. Of course, a user desiring to remove the larger second removable portion 430 can remove the first removable portion 420 by tearing away the first track 425 before removing the remainder of the second removable portion 430 by tearing away the second track 435.

While this disclosure has been described in conjunction with the specific embodiments outlined above, it is evident that many alternatives, modifications and variations will be apparent to those skilled in the art. For instance, those having skill in the requisite art should appreciate that various structural configurations and processes may be implemented to allow a portion of the bottom surface 11, 211, 311, 411 to peel away from the base portion 10, 210, 310, 410. Accordingly, the preferred embodiments of the present disclosure as set forth above are intended to be illustrative, not limiting. Various changes may be made without departing from the spirit and scope of the invention, as required by the following claims. The claims provide the scope of the coverage of the invention and should not be limited to the specific examples provided herein.

What is claimed is:

1. A configurable enclosure for housing broadband equipment, the configurable enclosure comprising:

a base; and a cover coupled with the base, the cover being configured to physically cover an interior of the configurable enclosure in a closed position;

wherein a bottom surface of the base includes a first removable portion configured to be released from the base, the first removable portion being surrounded by a first track, wherein the bottom surface of the base includes a second removable portion configured to be released from the base, the second removable portion being surrounded by a second track and including the first removable portion, wherein the first removable portion is disposed within the second removable portion on the bottom surface of the base such that the second removable portion includes a first edge having a portion shared with a first edge of the first removable portion and a second edge having a portion shared with a second edge of the first removable portion, wherein the first track includes a first portion that is aligned with a first portion of the second track and a second portion aligned with a second portion of the second track, the first portion of the first track being separated from the first portion of the second track by a void configured as a curved slit, wherein a first actuator is positioned on the first track and a second actuator is positioned on the second track, wherein the first removable portion and the first track are configured to be separated from the base through manipulation of the first actuator and the first track in a first direction, thereby creating a first opening through the bottom surface without disturbing the second track, and wherein the second removable portion and the second track are configured to be separated from the base through the manipulation of the first actuator and the first track in the first direction and manipulation of the second actuator and the second track in a second direction, opposite to the first direction, thereby creating a second opening through the bottom surface that is larger than the first opening.

2. The configurable enclosure of claim 1, wherein the void prevents the manipulation of the first actuator and the first track from separating the second removable portion and the second track from the base.

3. The configurable enclosure of claim 1,
wherein the first removable portion, the first track, the second removable portion, and the second track are configured such that the first removable portion and the first track are separable from the base before the second removable portion and the second track are separated from the base.

4. The configurable enclosure of claim 1,
wherein the first removable portion, the first track, the second removable portion, and the second track are configured such that the second track and a portion of the second removable portion are separable from the base before the first removable portion and the first track are separated from the base.

5. A configurable enclosure for housing broadband equipment, the configurable enclosure comprising:
a base; and
a cover configured to be coupled with the base to physically cover an interior of the configurable enclosure in a closed position;
wherein a surface of the base includes a first removable portion configured to be released from the base, the first removable portion being surrounded by a first track,
wherein the surface of the base includes a second removable portion configured to be released from the base, the second removable portion being surrounded by a second track and including the first removable portion,
wherein the second removable portion includes a first edge shared with a first edge of the first removable portion and a second edge shared with a second edge of the first removable portion,
wherein the first track includes a first portion that is aligned with a first portion of the second track and a second portion aligned with a second portion of the second track, the first portion of the first track being separated from the first portion of the second track by a void, and
wherein the first removable portion and the first track are configured to be separated from the base through manipulation of a first actuator and the first track in a first direction, thereby creating a first opening through the surface without disturbing the second track.

6. The configurable enclosure of claim 5,
wherein the first actuator is positioned on the first track, and a second actuator is positioned on the second track.

7. The configurable enclosure of claim 6,
wherein the second removable portion and the second track are configured to be separated from the base through the manipulation of the first actuator and the first track in the first direction and manipulation of the second actuator in a second direction, opposite to the first direction, thereby creating a second opening through the surface that is larger than the first opening.

8. The configurable enclosure of claim 5,
wherein the second removable portion and the second track are configured to be separated from the base through the manipulation of the first actuator and the first track in the first direction and manipulation of the second actuator in a second direction, opposite to the first direction, thereby creating a second opening through the surface that is larger than the first opening.

9. The configurable enclosure of claim 5,
wherein the void prevents the manipulation of the first actuator and the first track from separating the second removable portion and the second track from the base.

10. The configurable enclosure of claim 9,
wherein the void is configured as a curved slit.

11. The configurable enclosure of claim 5,
wherein the first removable portion, the first track, the second removable portion, and the second track are configured such that the first removable portion and the first track are separable from the base before the second removable portion and the second track are separated from the base.

12. The configurable enclosure of claim 5,
wherein the first removable portion, the first track, the second removable portion, and the second track are configured such that the second track and a portion of the second removable portion are separable from the base before the first removable portion and the first track are separated from the base.

13. A configurable enclosure for housing broadband equipment, the configurable enclosure comprising:
a base; and
a cover configured to be coupled with the base to physically cover an interior of the configurable enclosure in a closed position;
wherein a surface of the base includes a first removable portion configured to be released from the base, the first removable portion being surrounded by a first track,
wherein the surface of the base includes a second removable portion configured to be released from the base, the second removable portion being surrounded by a second track and including the first removable portion,
wherein the second removable portion includes a first edge shared with a first edge of the first removable portion and a second edge shared with a second edge of the first removable portion,
wherein the first track includes a first portion that is aligned with a first portion of the second track and a second portion aligned with a second portion of the second track, the first portion of the first track being separated from the first portion of the second track by a void, and
wherein the second removable portion and the second track are configured to be separated from the base through manipulation of a first actuator and the first track in the first direction and manipulation of a second actuator and the second track in a second direction, opposite to the first direction, thereby creating a second opening through the surface that is larger than the first opening.

14. The configurable enclosure of claim 13,
wherein the first actuator is positioned on the first track, and the second actuator is positioned on the second track.

15. The configurable enclosure of claim 14,
wherein the first removable portion and the first track are configured to be separated from the base through manipulation of a first actuator and the first track in a first direction, thereby creating a first opening through the surface without disturbing the second track.

16. The configurable enclosure of claim 13,
wherein the first removable portion and the first track are configured to be separated from the base through manipulation of a first actuator and the first track in a first direction, thereby creating a first opening through the surface without disturbing the second track.

17. The configurable enclosure of claim 13,
wherein the void prevents the manipulation of the first actuator and the first track from separating the second removable portion and the second track from the base.

18. The configurable enclosure of claim 17,
wherein the void is configured as a curved slit.

19. The configurable enclosure of claim 13,
wherein the first removable portion, the first track, the second removable portion, and the second track are configured such that the first removable portion and the first track are separable from the base before the second removable portion and the second track are separated from the base.

20. The configurable enclosure of claim 13,
wherein the first removable portion, the first track, the second removable portion, and the second track are configured such that the second track and a portion of the second removable portion are separable from the base before the first removable portion and the first track are separated from the base.

\* \* \* \* \*